United States Patent
Nambiar et al.

(10) Patent No.: US 10,313,292 B2
(45) Date of Patent: Jun. 4, 2019

(54) METHODS AND SYSTEMS FOR CONNECTING MESSAGING ACCOUNTS

(71) Applicant: Facebook, Inc., Menlo Park, CA (US)

(72) Inventors: Akhil Nambiar, San Francisco, CA (US); Kunal Nikhil Modi, Fremont, CA (US); Brian Kimball, San Francisco, CA (US)

(73) Assignee: FACEBOOK, INC., Menlo Park, Inc.

( * ) Notice: Subject to any disclaimer, the term of this patent is extended or adjusted under 35 U.S.C. 154(b) by 174 days.

(21) Appl. No.: 15/216,372

(22) Filed: Jul. 21, 2016

(65) Prior Publication Data

US 2018/0026929 A1 Jan. 25, 2018

(51) Int. Cl.
*H04L 12/58* (2006.01)
*H04L 29/08* (2006.01)
*H04W 4/21* (2018.01)

(52) U.S. Cl.
CPC .............. *H04L 51/26* (2013.01); *H04L 51/24* (2013.01); *H04L 51/32* (2013.01); *H04L 67/24* (2013.01); *H04L 67/26* (2013.01); *H04W 4/21* (2018.02)

(58) Field of Classification Search
CPC .... G06Q 30/02; G06Q 30/0201; G06Q 30/06; G06Q 50/01; H04L 51/32; H04L 65/403
See application file for complete search history.

(56) References Cited

U.S. PATENT DOCUMENTS

| | | | | |
|---|---|---|---|---|
| 9,363,223 | B2* | 6/2016 | Arquette | H04L 51/32 |
| 2004/0181462 | A1* | 9/2004 | Bauer | G06Q 10/107 |
| | | | | 705/26.1 |
| 2014/0189530 | A1* | 7/2014 | Anand | H04L 65/403 |
| | | | | 715/753 |
| 2016/0191448 | A1* | 6/2016 | Eck | H04L 51/32 |
| | | | | 709/206 |
| 2016/0344872 | A1* | 11/2016 | Mathison | H04M 15/715 |
| 2017/0099358 | A1* | 4/2017 | Perez | H04L 51/046 |

* cited by examiner

*Primary Examiner* — Glenford J Madamba

(57) ABSTRACT

Exemplary embodiments relate to techniques for notifying existing users when a new user joins a messaging service (or returns from a period of inactivity). A top n number of existing users acquainted with the new user may be selected and may be encouraged to message the new user. The existing users may be selected using a messaging coefficient that indicates a likelihood that a message will result in a meaningful conversation, and a number of other factors that prevent the existing users from becoming inundated with notifications. The number n may be selected based on an amount of display space available to the new user in a messaging application. When inviting the existing users to contact the new user, a new thread may be automatically created and bumped to the top of the new user's thread list.

17 Claims, 25 Drawing Sheets

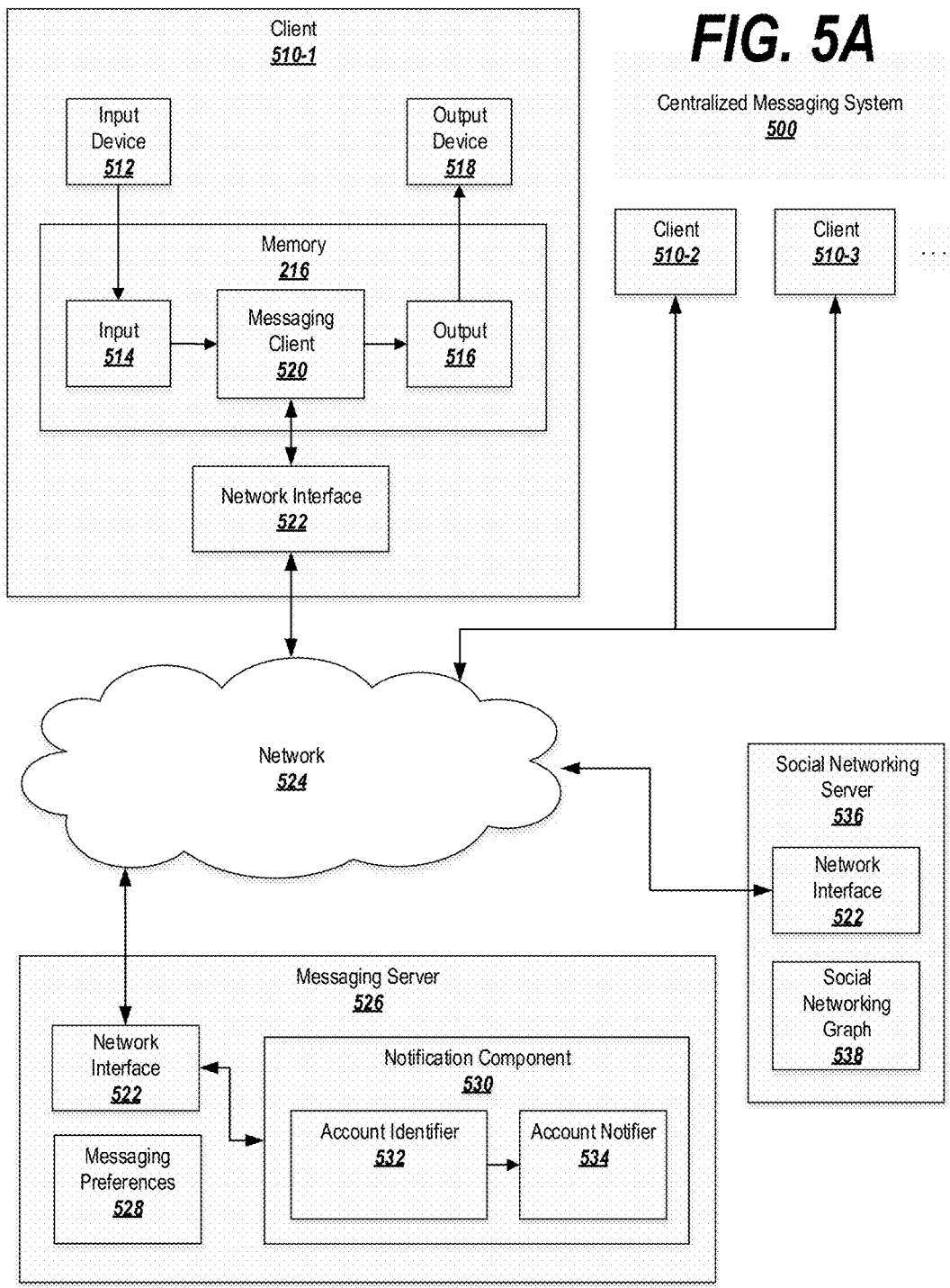

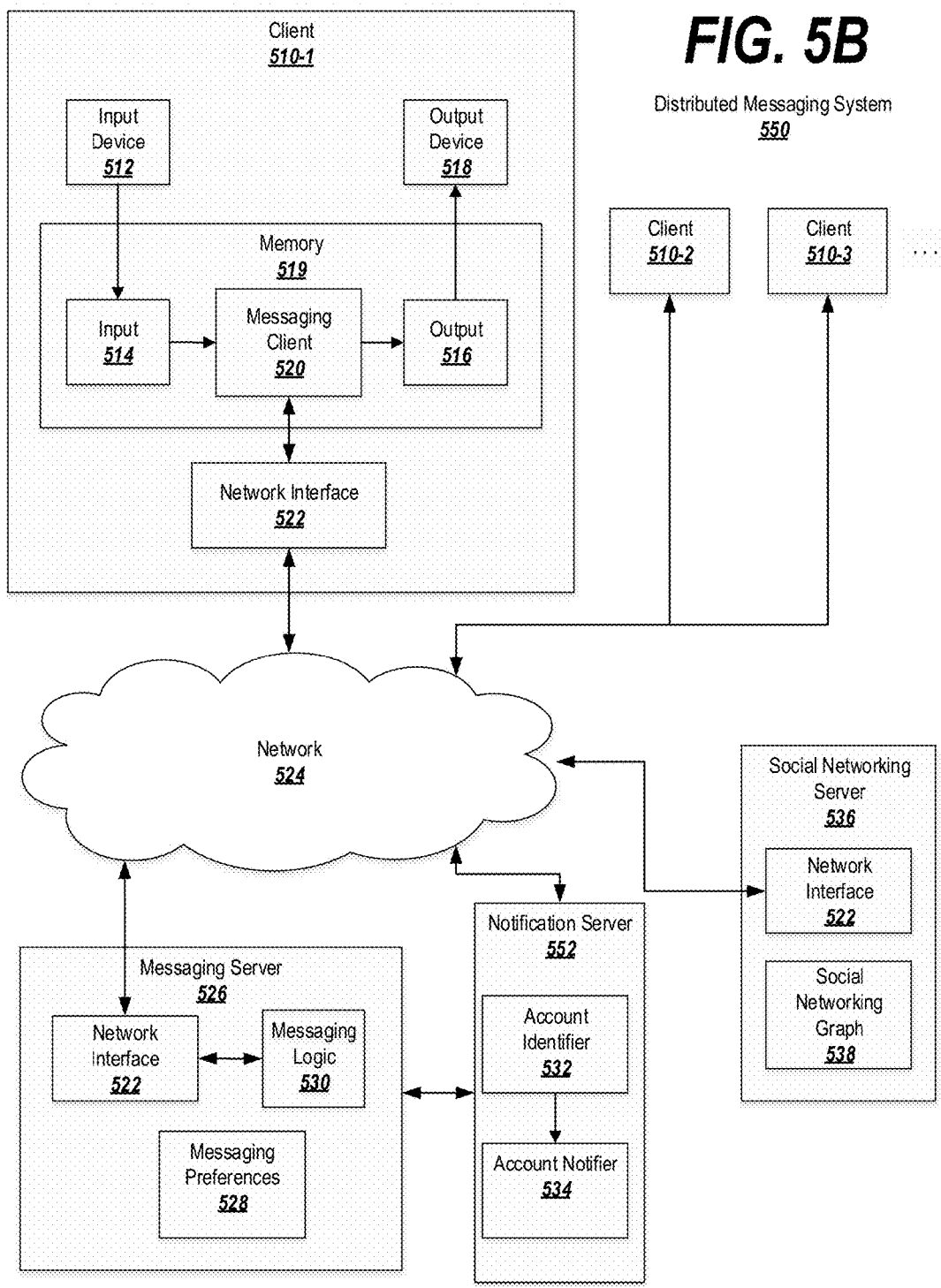

New User Client-Side Messaging Logic
*600*

Existing User Client-Side Messaging Logic
800

METHODS AND SYSTEMS FOR CONNECTING MESSAGING ACCOUNTS

BACKGROUND

Messaging systems, such as instant messaging systems and short message service ("SMS") systems, allow users to communicate with each other by exchanging messages. When a user first joins a messaging service, or returns to a messaging service after a period of inactivity, the user may not be aware of which other users are reachable through the messaging service. If the user does not engage with other users in the period after they join the messaging service, there may be an increased likelihood that the user will become inactive.

BRIEF DESCRIPTION OF THE DRAWINGS

FIG. 5A is a block diagram providing an overview of a system including an exemplary centralized messaging service;

FIG. 5B is a block diagram providing an overview of a system including an exemplary distributed messaging service;

DETAILED DESCRIPTION

Figure 1A:
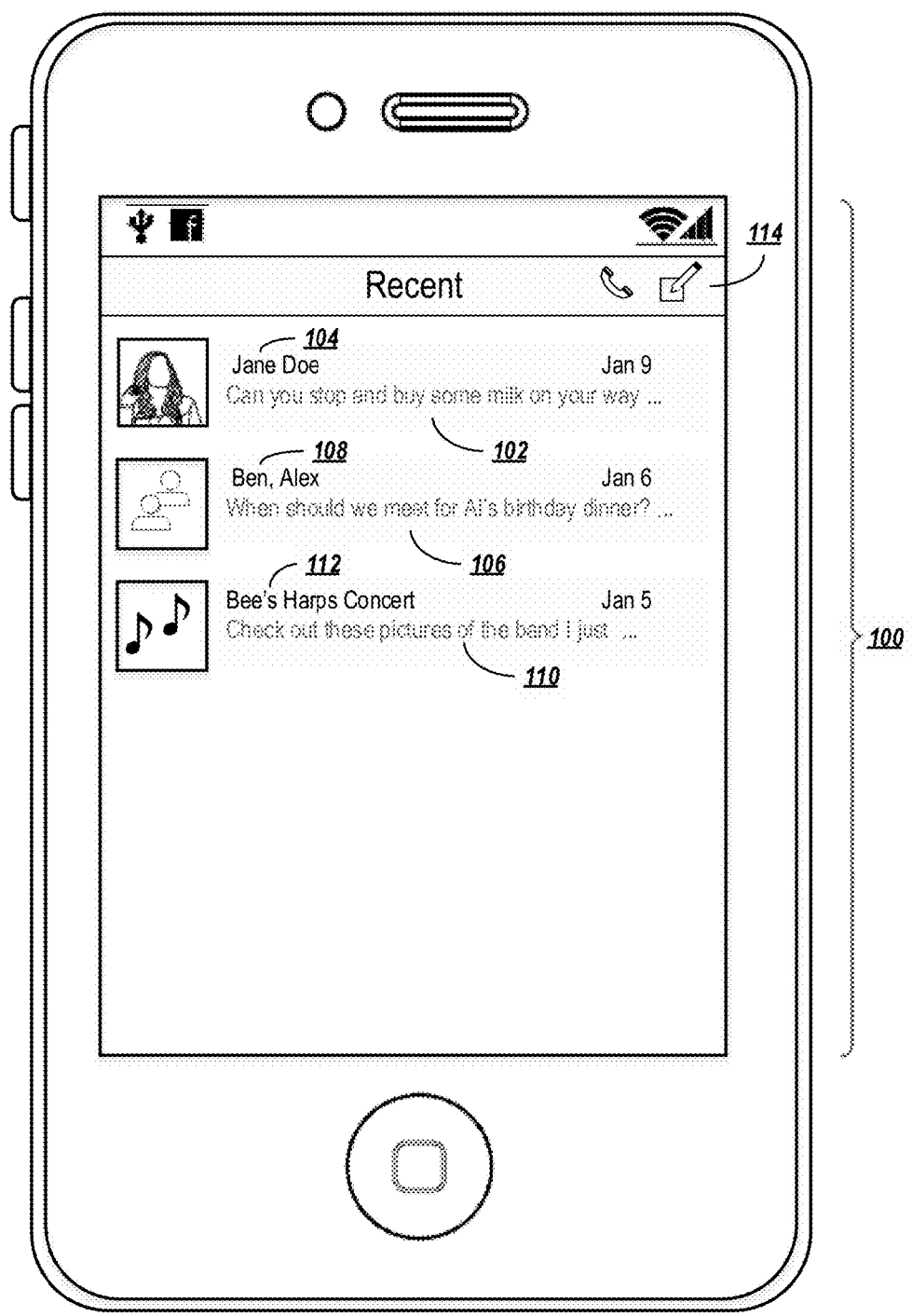
FIG. 1A depicts an exemplary messaging interface including several types of individual and group messages.

Exemplary embodiments described herein pertain to improvements in messaging systems, and in particular address several aspects of encouraging communication through a messaging service by notifying selected groups of existing users of the messaging system upon a change in status of a selected user. The notification may encourage the existing users to send a message to the selected user. Receiving a message in response to certain types of status changes, such as the creation of a new account or a return from inactivity, may encourage the selected user to become or remain active with the messaging service.

The change in status may be, for example, the establishment of a new account associated with the selected user in the messaging service, a return to activity of the selected user's account after a period of inactivity, or a change in the state of a connection between the selected user and the existing user (e.g., two users becoming friends in an associated social networking service, or entering into a relationship with each other).

Upon detecting the status change, a number of existing users may be selected and may be notified of the status change. The number selected may be dependent on a number of factors, such as an amount of display space available to the selected user's messaging client. Existing users may be excluded from consideration if they have already received a predetermined number of notifications in a predetermined amount of time (e.g., one per day and/or two per week). The existing users may be associated with a score or metric that measures the likelihood that a message from the existing user to the selected user with result in a meaningful conversation, and the highest scoring of the existing users may be selected to receive the notifications.

Notifying the existing users of the status change may involve displaying a notification of the status change, automatically creating a new message thread and prioritizing the new message thread in the list of message threads in the existing user's messaging application, and/or altering a display associated with the messaging application (e.g., by changing a badge associated with the messaging application's icon to reflect the receipt of a new message). At the selected user's messaging application, any messages received from the existing users in response to the notifications may be elevated or prioritized above other messages.

In practice, exemplary embodiments have resulted in new users participating in many more conversations as compared to a system in which new user notifications are not sent and the resulting message threads prioritized. This indicates that the notifications and thread prioritization helps to make existing users aware that they can now send messages to the new user, and also demonstrates that surfacing these notifications may be valuable to the messaging service in terms of increased user engagement.

As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, 122-4, and 122-5. The embodiments are not limited in this context.

Messaging Overview

A general overview of messaging techniques is now described.

Users may interact with a messaging system through a client application. FIG. 1A depicts an example of a client application displaying a messaging interface 100. The messaging interface 100 of FIG. 1A shows an exemplary summary screen that provides an overview of messages recently sent to (or by) the user of the client application.

Messaging systems may support a variety of different types of messages. For example, the messaging interface 100 includes a summary of a one-to-one (or individual) message 102. A one-to-one message is a message exchanged between two entities, so that only the two entities can see and participate in the conversation. For example, in the one-to-one message 102, the current user (Jack Doe) recently received a message from his wife, Jane Doe. The other participant in the conversation is indicated in the interface 100 using an identifier 104 (including a name and profile picture, in this example). Only Jack and Jane participate in the conversation, and only Jack and Jane can view the conversation.

Another message type supported by the messaging system is a group conversation. In a group conversation, multiple users see and participate in the conversation. FIG. 1A depicts an exemplary summary of a group conversation 106. In the summary of the group conversation 106, each of the other users participating in the conversation is indicated by respective identifiers 108. In this case, the identifiers include the names or handles of the other users participating in the group conversation, and an icon to indicate that the conversation is a group conversation. For example, in this case the current user (Jack) is participating in a conversation with his friends Ben and Alex. Jack, Ben, and Alex can each see all of the messages in the conversation (regardless of who sent the message) and can send messages to the group.

Another type of message supported by the messaging system is a message between one or more users and an organization (such as a business) or event. For example, FIG. 1A shows an event message 110 sent by the current user (Jack) to the page of an event being organized through a social network. The identifier 112 identifies the name of the event, and an icon is presented identifying this particular event is a concert. In an event message 110, all participants in the event (as a participant is defined, e.g., by the event's social networking page) can view and send event messages 110. Participants may include, for example, people attending the event, fans of the event that have signed up with the event's page to receive messages about the event, event organizers, etc.

By selecting an existing message summary 102, 106, 110, the user can view messages in an existing conversation and add new messages to the conversation. Moreover, the interface 100 includes interface elements 114 allowing the user to create a new message.

Figure 1B:
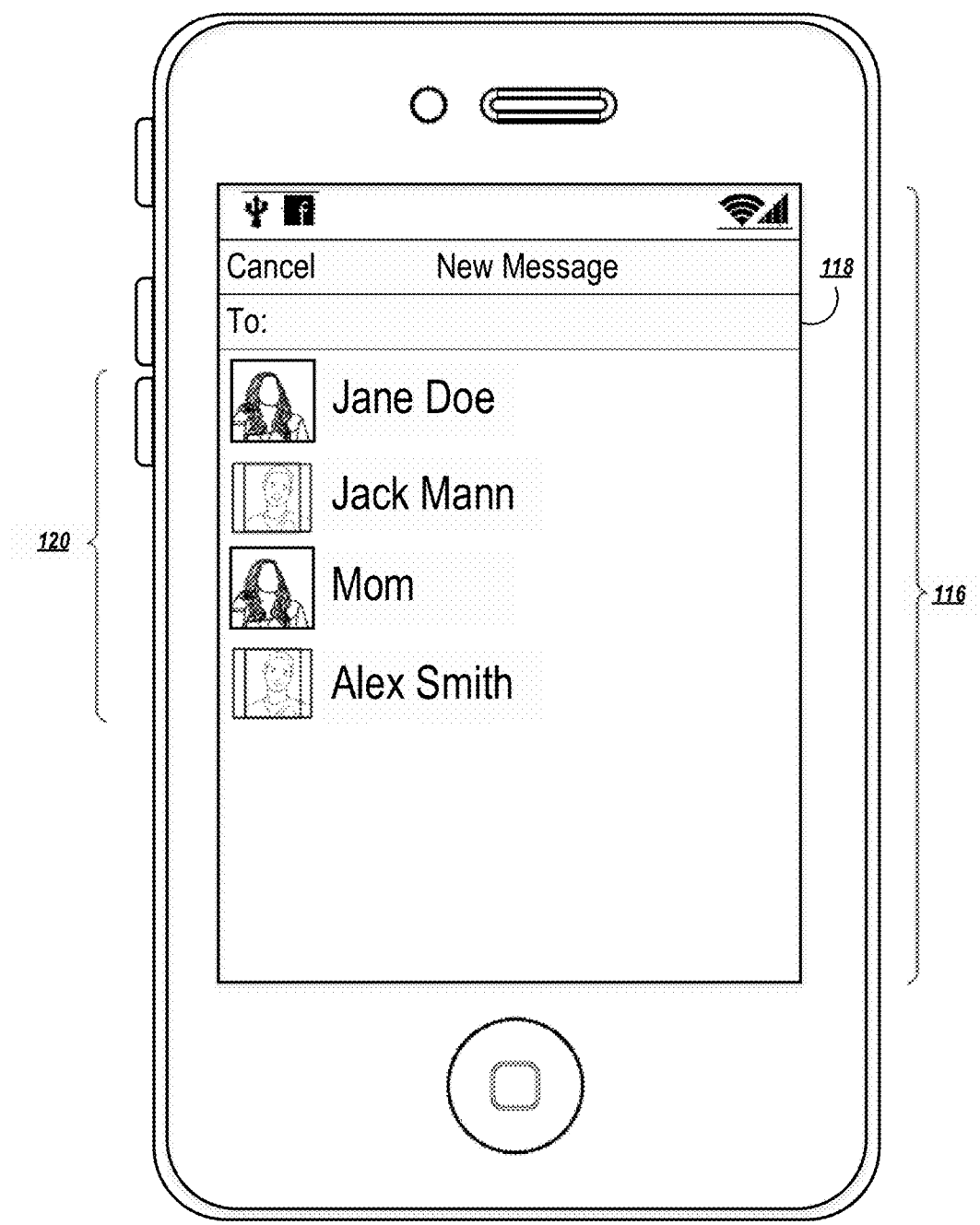
FIG. 1B depicts an exemplary message composition interface.

For example, FIG. 1B depicts an interface 116 displayed by the messaging client application in response to receiving a selection of the "compose" interface element 114. A "new message" window is displayed in the interface 116. The new message window includes a recipient field 118 for allowing the user to manually enter identifiers for one or more recipients. If available, the user's contacts list 120 may also be displayed in the interface 116 in order to simplify the selection of the recipients.

Figure 1C:
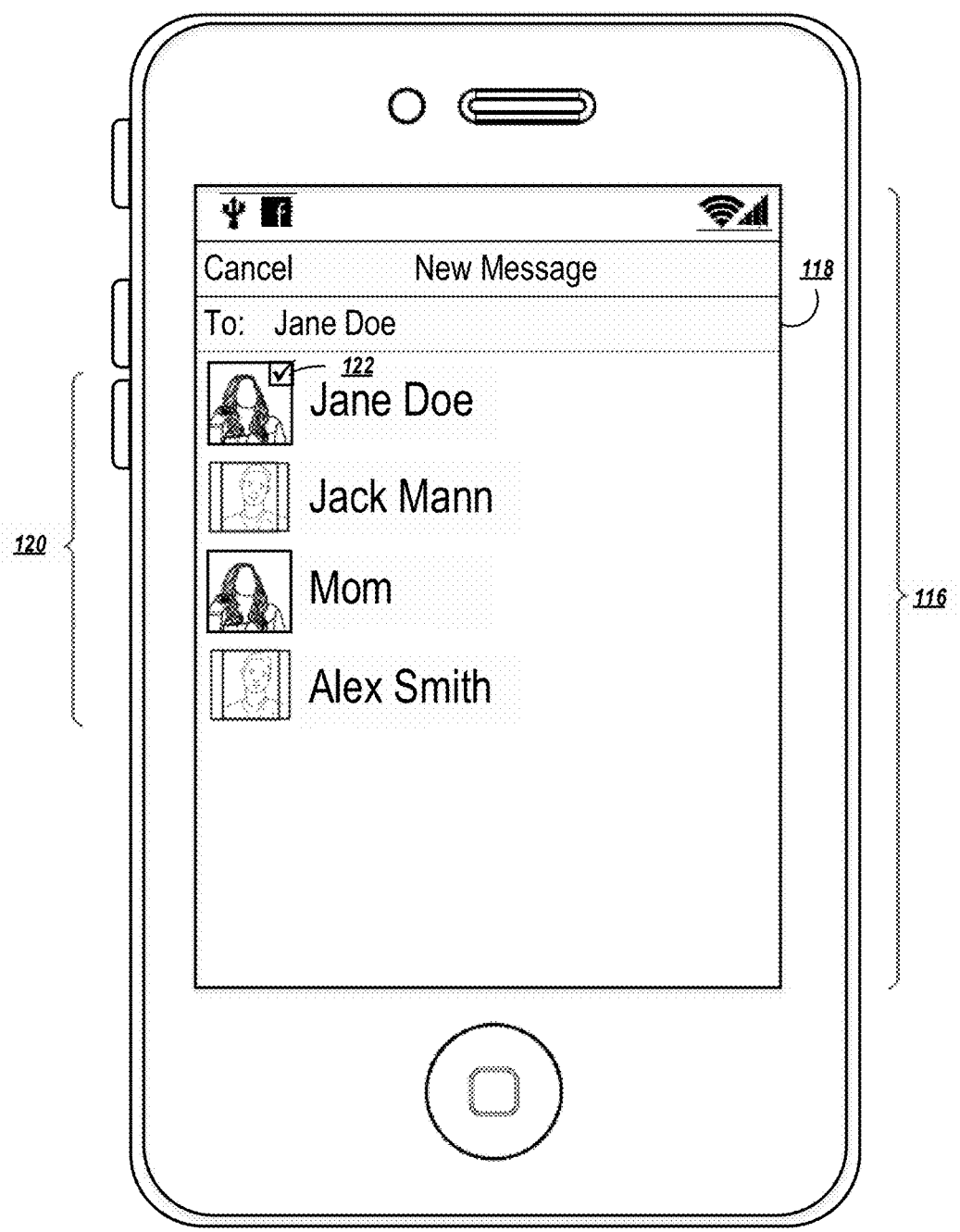
FIG. 1C depicts an example of selecting a recipient of a message in a messaging interface.

In the example of FIG. 1C, the user has entered the identifier of a recipient in the recipient field 118. In order to indicate the recipient's inclusion in the recipients list, a selection indication 122 is displayed on the recipient's icon in the contacts list 120.

Figure 1D:
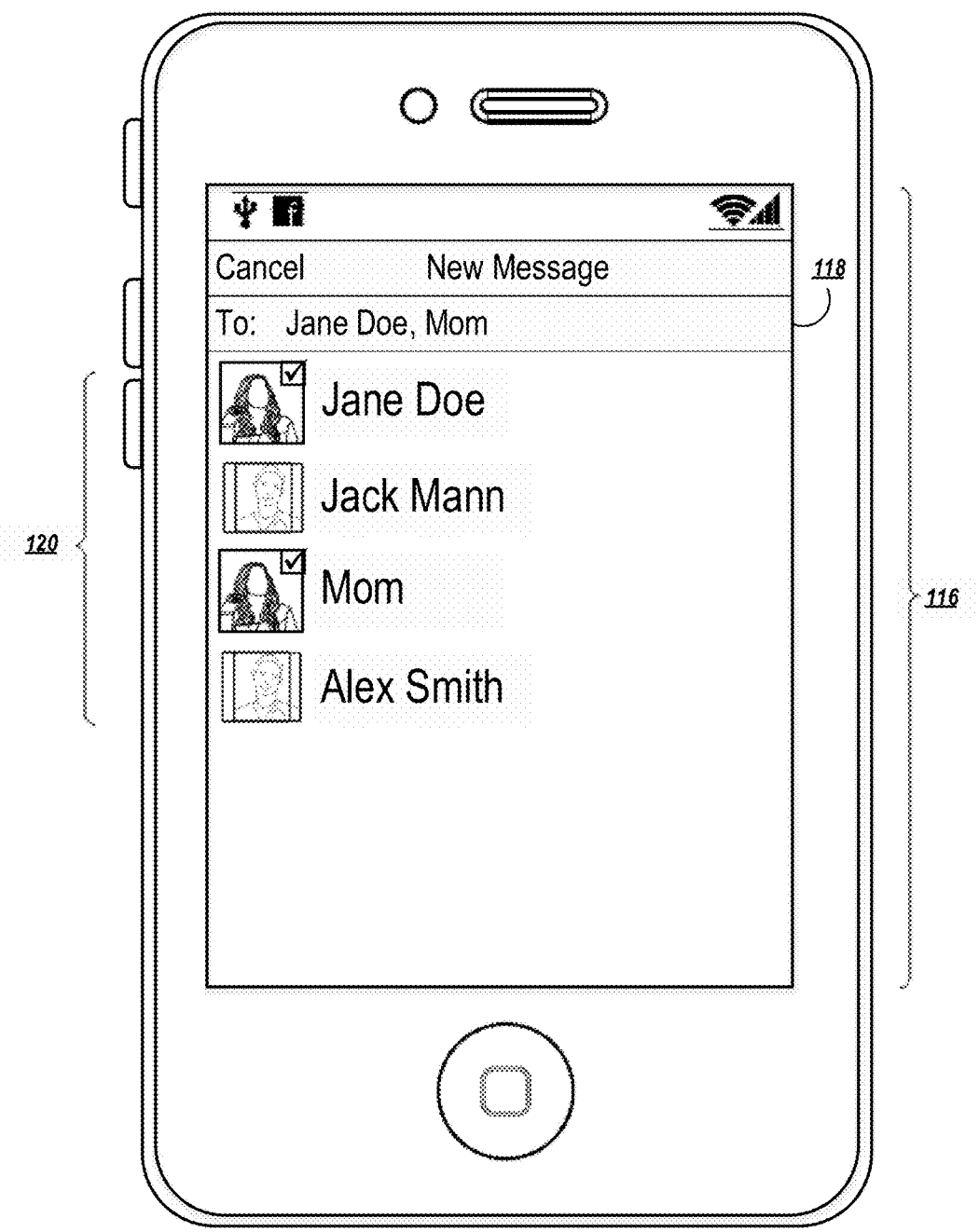
FIG. 1D depicts an example of selecting a group of recipients of a message in a messaging interface.

It is possible to select more than recipient in the interface 116 in order to create a group message, e.g. by manually adding multiple recipients in the recipient filed 118, selecting multiple contacts in the contacts list 120, or a combination of methods. FIG. 1D depicts an example of such a group selection.

This brief summary is intended to serve as a non-limiting introduction to the concepts discussed in more detail below, in connection with FIGS. 2-8. However, before discussing further exemplary embodiments, a brief note on data privacy is first provided. A more detailed description of privacy settings and authentication will be addressed in connection with the following Figures.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in a wide variety of messaging systems, including messaging in a social network or on a mobile device (e.g., through a messaging client application or via short message service), among other possibilities. An overview of a messaging system is now provided.

Interfaces for New User Notifications

FIGS. 2A-4D provide various examples of interfaces for providing and canceling new user notifications.

Figure 2A:
FIGS. 2A-2D depict exemplary interfaces for providing new account notifications on an existing user's messaging client.

FIG. 2A depicts an exemplary interface 200 for the lock screen of a mobile device associated with an existing user of a messaging service. In this example, the existing user maintains an account with the messaging service and a social networking service associated with the messaging service. A friend of the existing user in the social networking service has recently joined the messaging service, causing a notification 202 to be provided from the messaging application. The notification 202 may be sent from the messaging application to the operating system of the mobile device in order to cause the operating system to display the notification 202 on the lock screen.

Figure 2B:
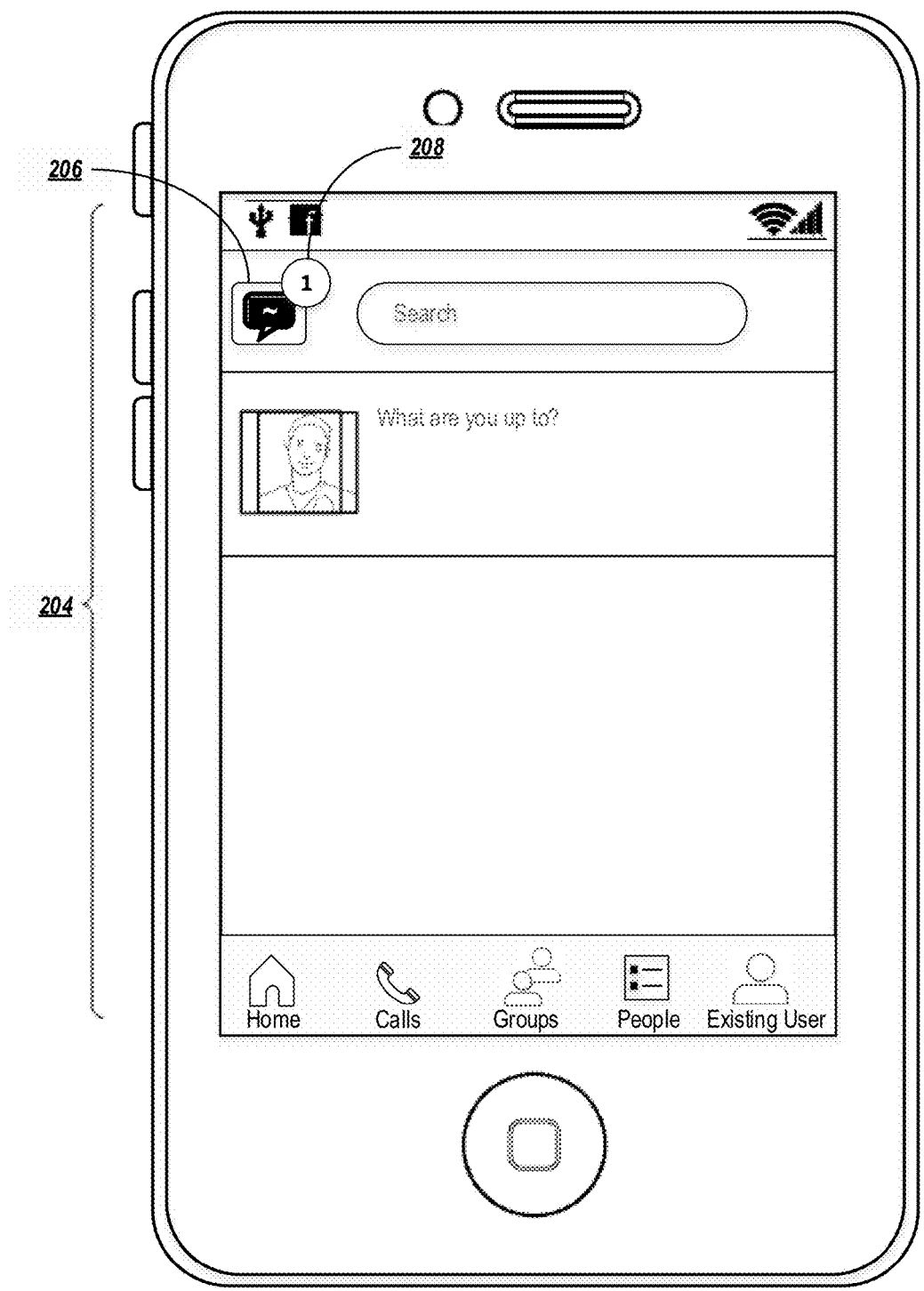

Upon interacting with the notification in the lock screen, an interface of the messaging application may be displayed, as shown in FIG. 2B. In this example, interacting with the notification causes the home screen 204 of the messaging application to be displayed. The home screen 204 includes a status icon 206 that may optionally include a badge 208 that indicates a number of recent or unread messages received by the messaging application.

Figure 2C:
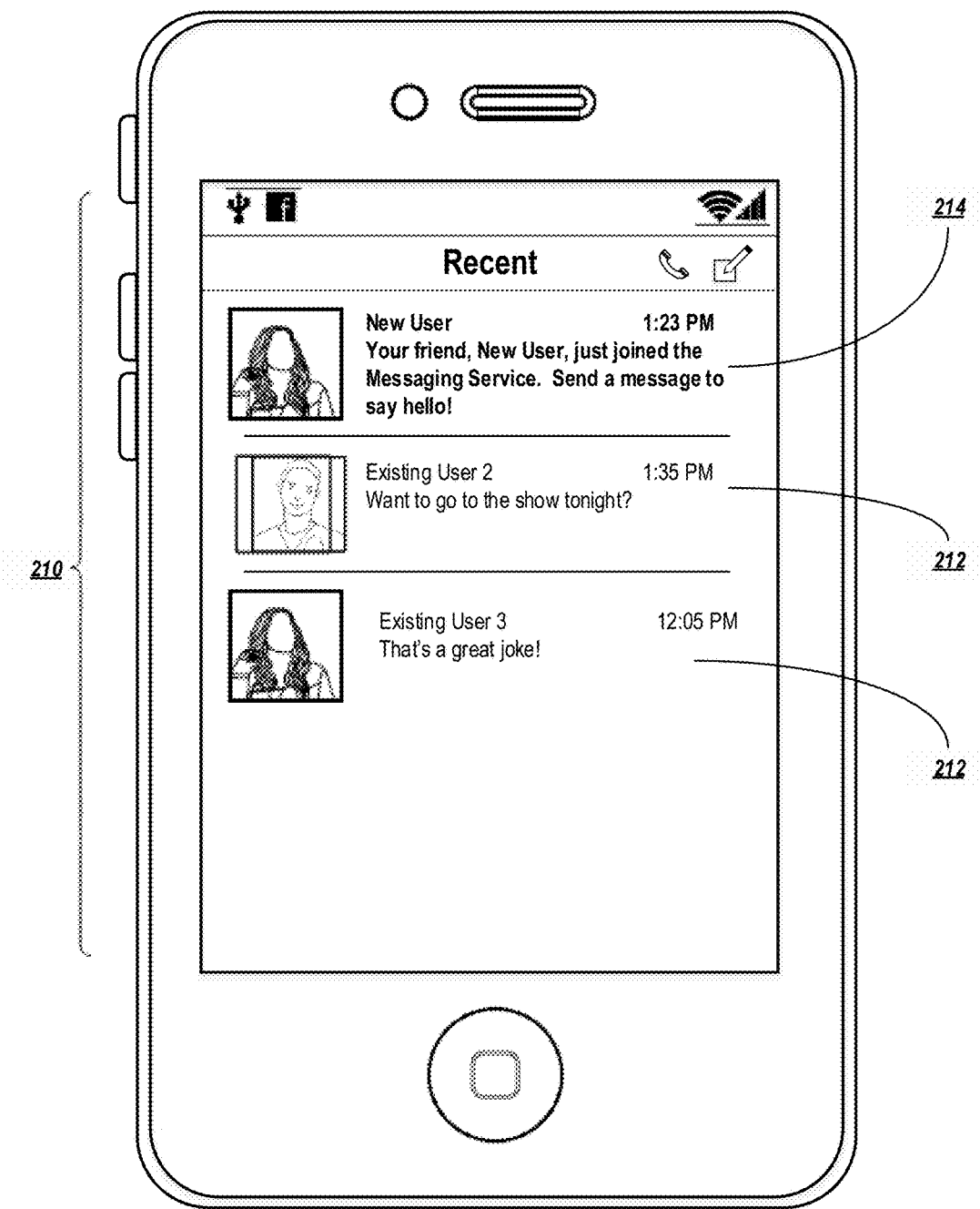

Interacting with the status icon 206 may cause a recent messages interface 210 to be shown, as depicted in FIG. 2C. The recent messages interface 210 may include a number of recent messages 212, where each recent message 212 is associated with a message thread; the most recent message in each thread may be displayed.

Furthermore, a new user notification message 214 may be displayed. The new user notification message 214 may be included in a new user notification thread. The new user notification thread may be created automatically and may be assigned a thread ID upon receiving an indication that the new user has undergone a status change (e.g., joining or rejoining the messaging service, the new user becoming friends with the existing user on a social networking service, etc.). Messages of the new user notification thread may be prioritized or elevated in the recent messages interface, or may be otherwise distinguished from the recent messages. For example, the new user notification message 214 may be displayed out-of-order (so that the new user notification message 214 is displayed before the recent messages 212, regardless of whether the new user notification message 214 was received before or after the recent messages 212).

The new user notification message 214 may indicate that a new user has undergone a status change. The new user notification message 214 may further prompt the existing user to send a message to the new user.

Figure 2D:
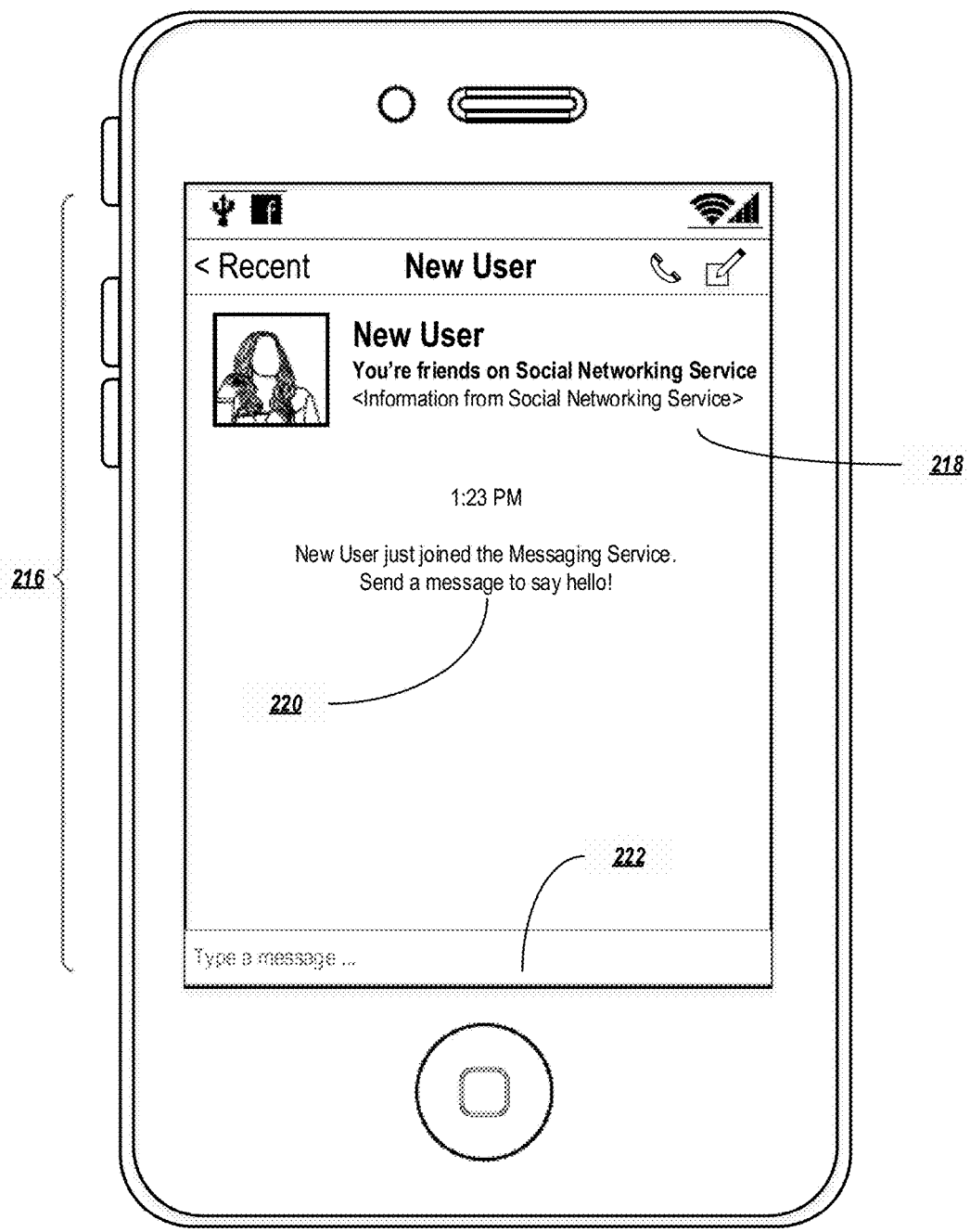

To this end, selecting the new user notification message 214 may cause a new user message creation interface 216 to be displayed, as shown in FIG. 2D. The new user message creation interface 216 may include identifying information 218 indicating who the new user is, and why the existing user was notified that the new user had joined the messaging service (e.g., by indicating a relationship of the new user to the existing user). The new user message creation interface 216 may further include a suggestion 220 that the existing user message the new user, and a prompt 222 to allow the existing user to create a message for the new user.

Upon typing a message in the prompt, the message may be transmitted to a messaging server. Optionally, the message may be sent with an indication that the message is a response to a new user notification message, so that the message may be elevated or prioritized in the new user's messaging interface.

Figure 3A:
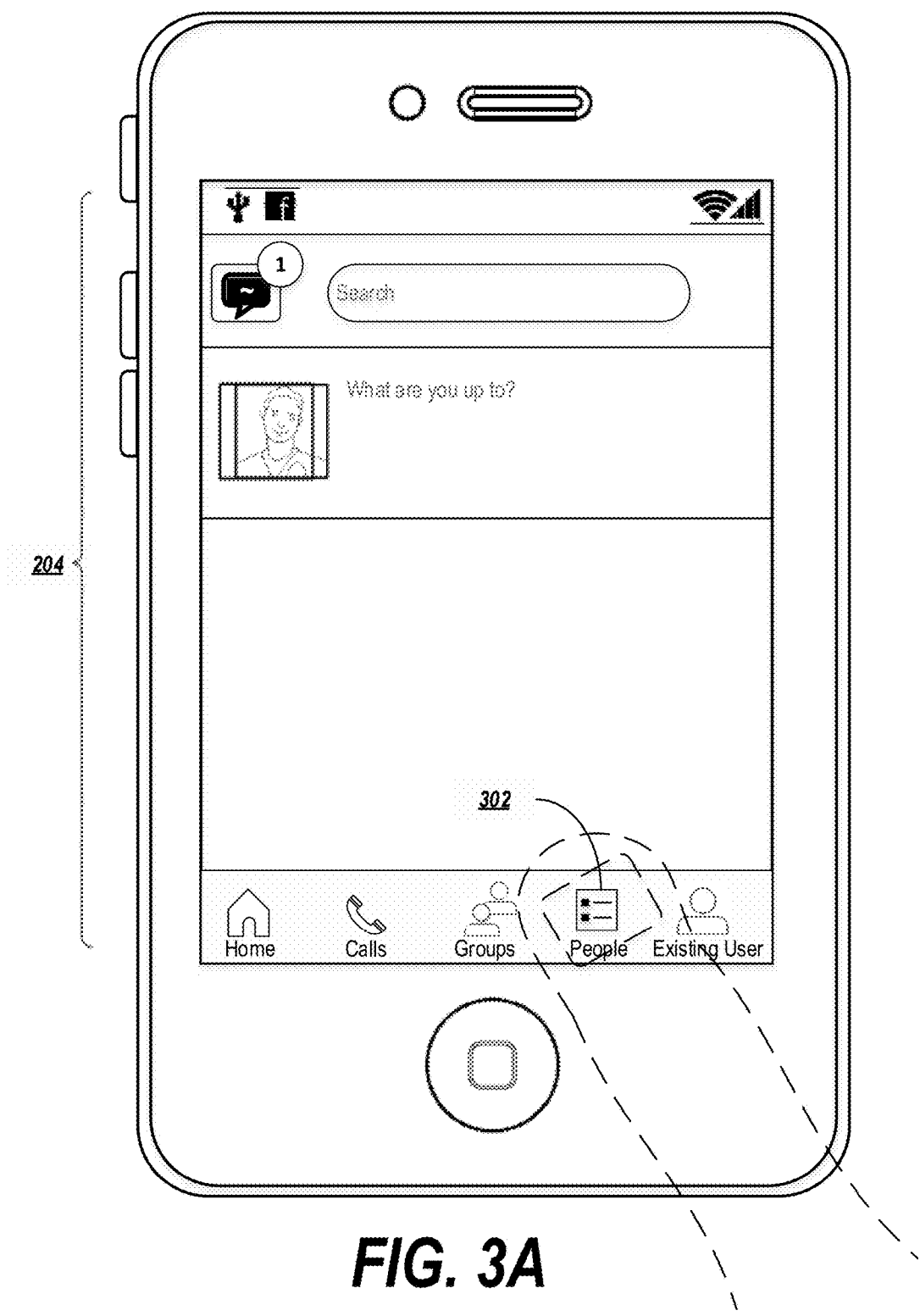
FIGS. 3A-3D depict further exemplary interfaces for notifying an existing user about a new account.
Figure 3B:
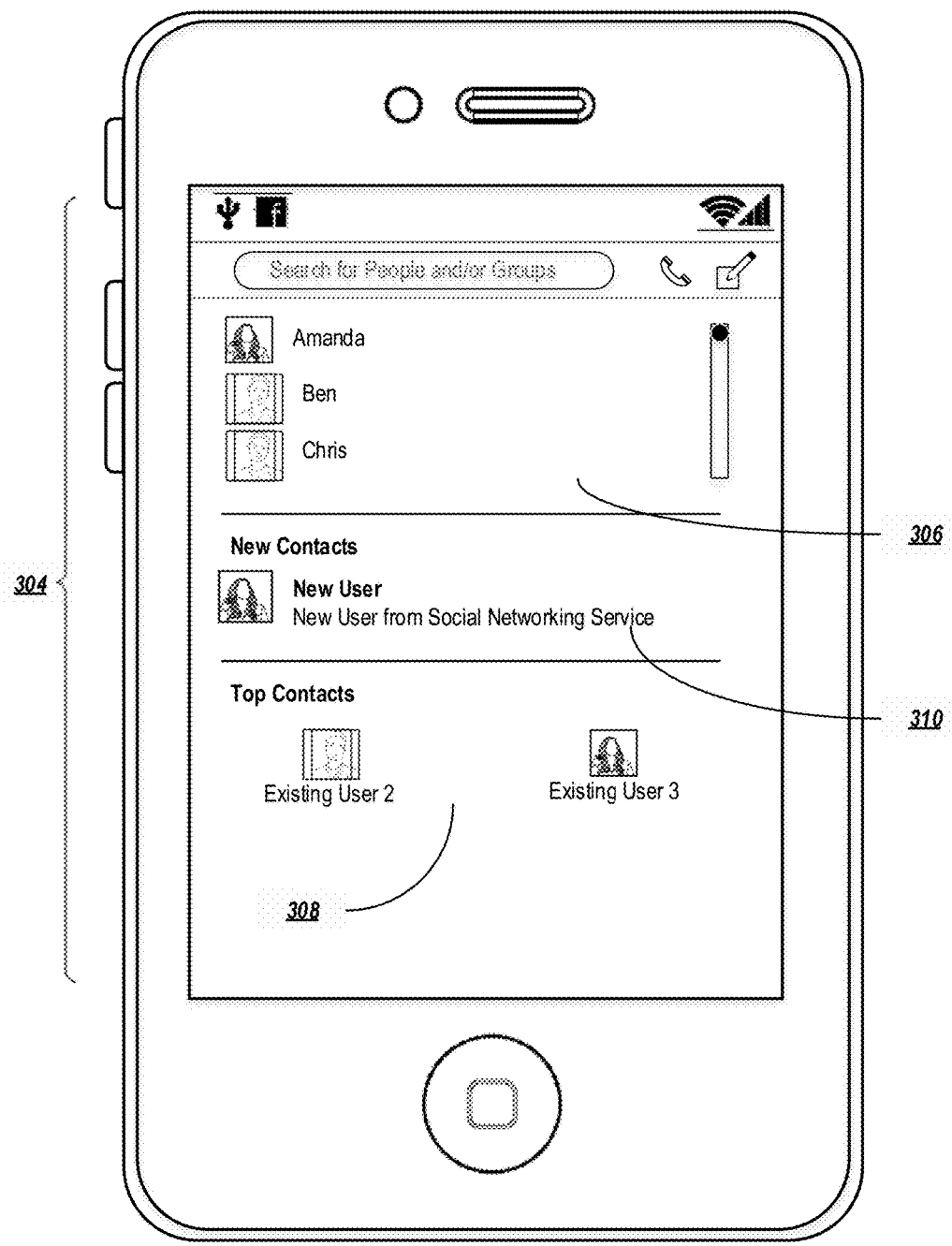

Alternatively or in addition, the existing user may be notified of the status change in other ways. For example, FIG. 3A again depicts the home screen 204 of the messaging application. The home screen 204 includes a people icon 302, which presents a list of contacts that the user may message. Upon selecting the people icon 302, a contacts interface 304 is displayed, as shown in FIG. 3B.

The contacts interface 304 includes a list of contacts 306, which lists all the contacts available to the existing user, and a top contacts list 308, which lists the most-messaged contacts that the existing user has messaged. A new contacts section 310 lists any new users associated with a new user notification. Other sections may be provided for other types of status changes (e.g., new friends, a new relationship, etc.). Alternatively, all users associated with status changes may be grouped into a common section that is separate from other user lists such as the list of contacts 306 and the top contacts list 308.

Figure 3C:
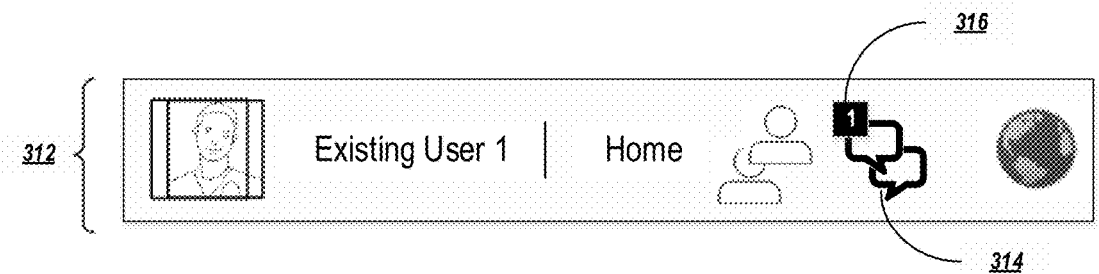
Figure 3D:
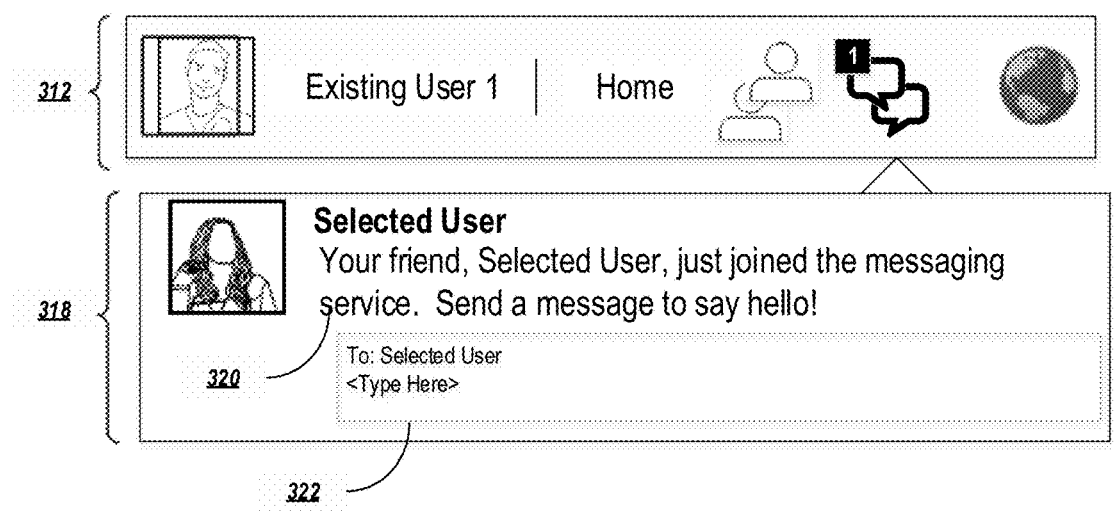

FIGS. 3C and 3D depict another option for notifying an existing user of a status change with another user. A menu bar 312 may be displayed on a messaging application, or elsewhere (e.g., on a main screen of a mobile device). The menu bar 312 may include a messages icon 314 with a badge 316 that indicates a number of recent or unread messages received from the messaging service. Upon interacting with the messages icon 314, a notification 318 may be presented. The notification 318 may include identifying information 320 that describes the change in status and suggests that the existing user send a message in response to the status change. The notification 318 may also include a prompt 322 that allows the existing user to compose a message directly from the notification 318.

In some cases, existing users may not wish to receive status change notifications. FIGS. 4A-4D depict exemplary interfaces for turning off such notifications.

Figure 4A:
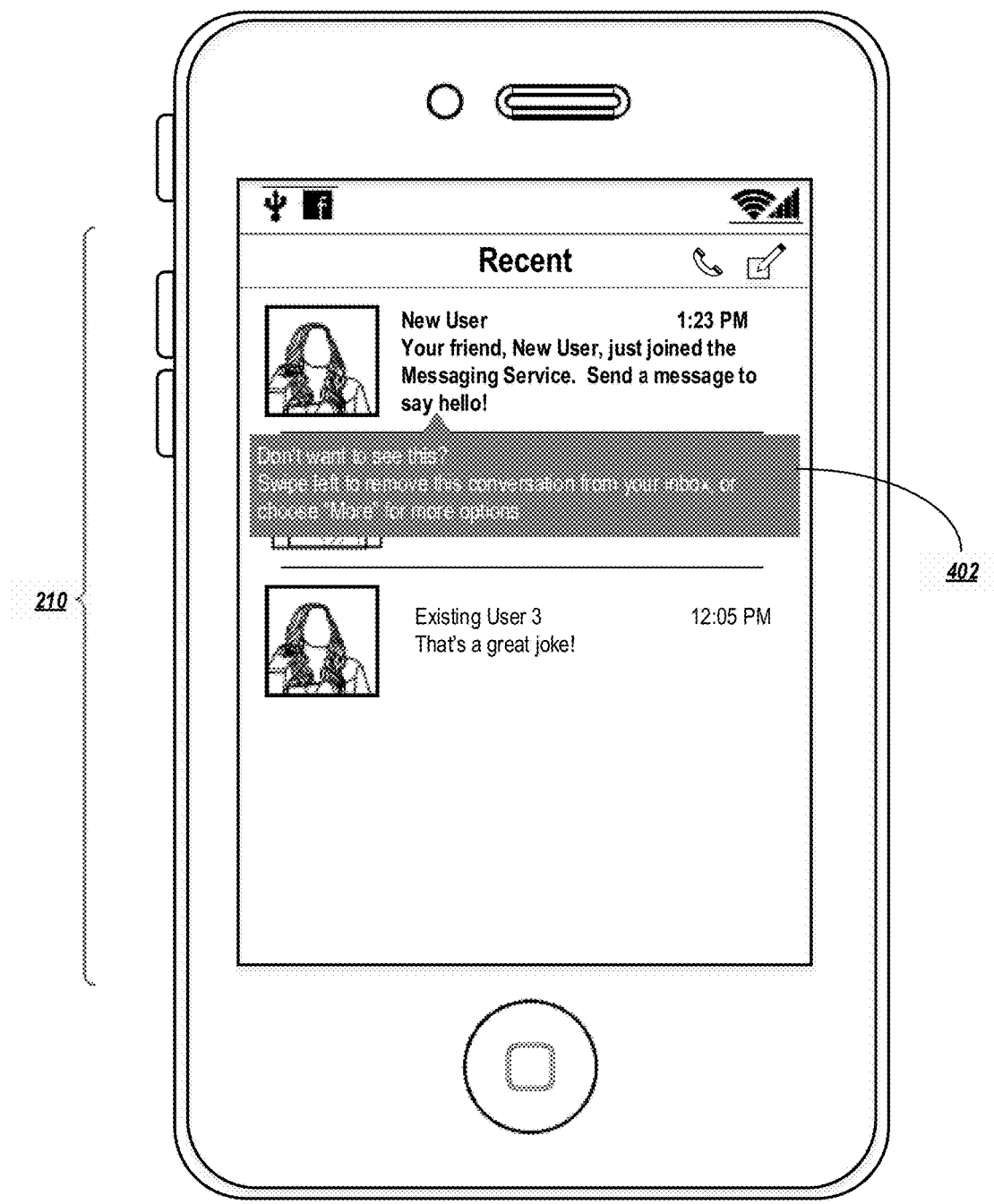
FIGS. 4A-4D depict exemplary interfaces for canceling new user notifications.
Figure 4B:
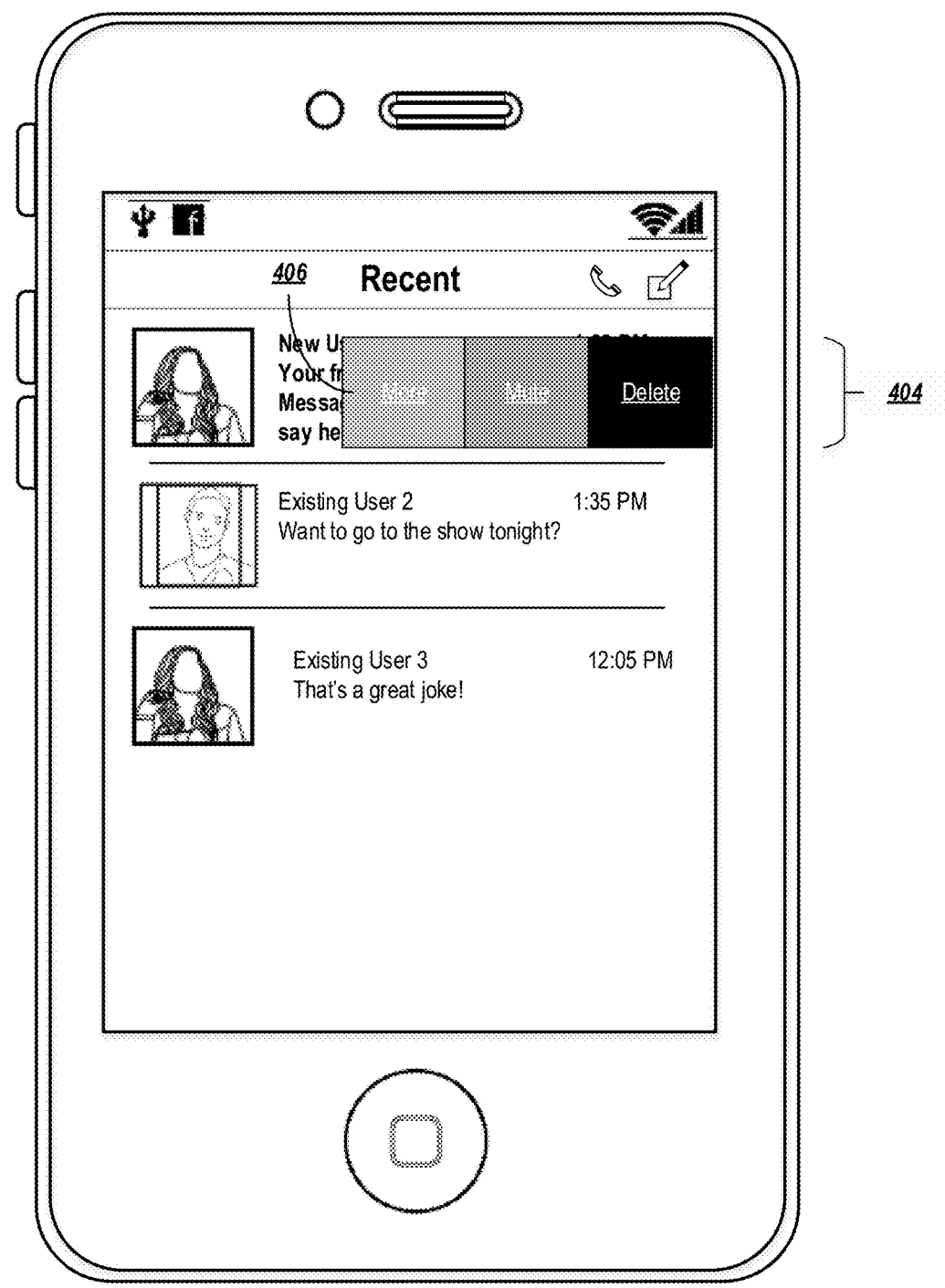

FIG. 4A depicts the recent messages interface 210. The first time a status change notification is sent, or for a predetermined number of status change notifications, an explanatory message 402 may be displayed on the interface 210. The explanatory message 402 may provide instructions for turning off status change notification messages. In this example, the explanatory message indicates that a particular gesture (swiping the message to the left) will bring up a menu allowing the user to select from a list of options. Such a menu 404 is shown in FIG. 4B. The menu includes a supplementary icon 406 for identifying further options.

Figure 4C:
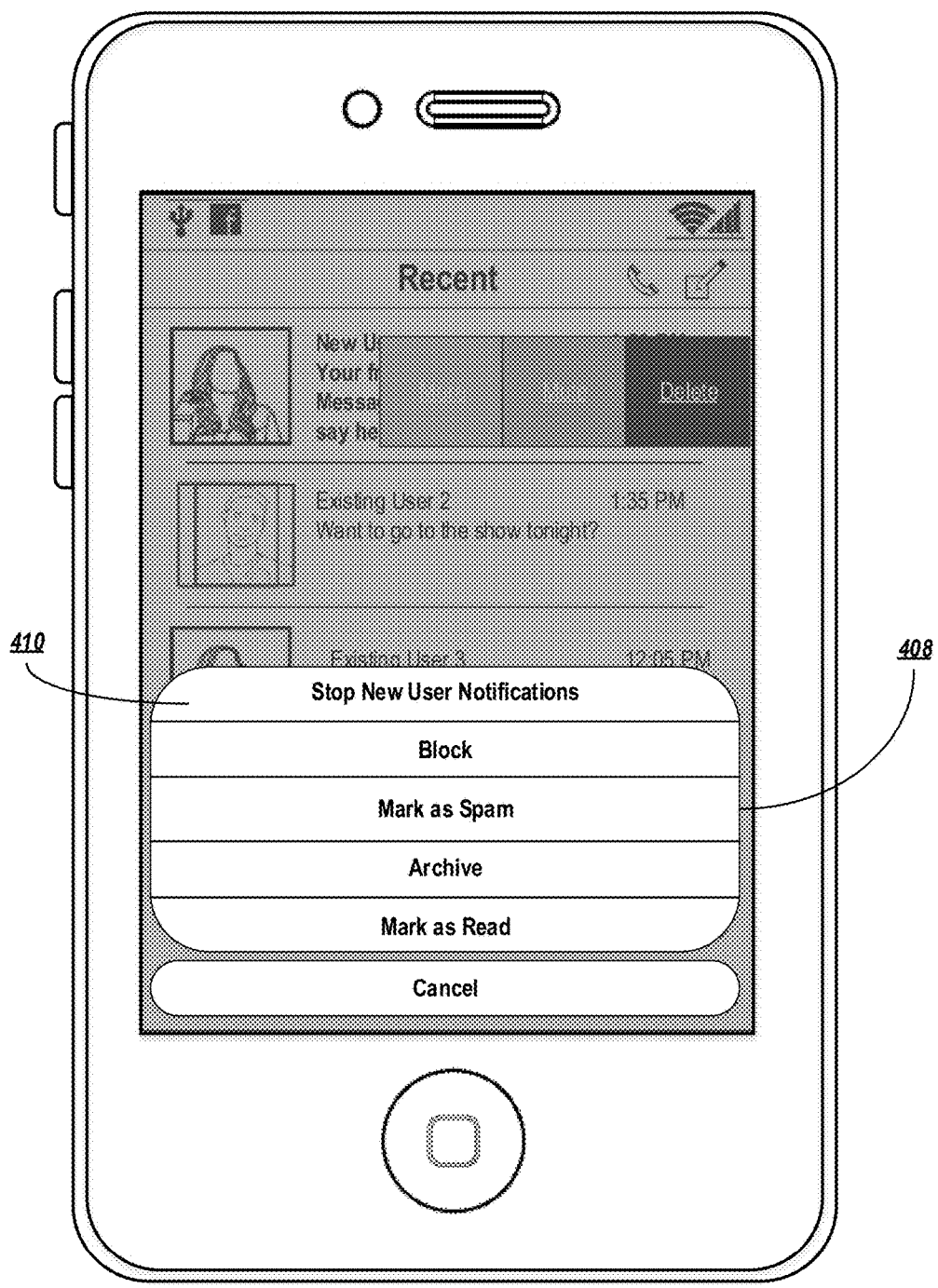
Figure 4D:
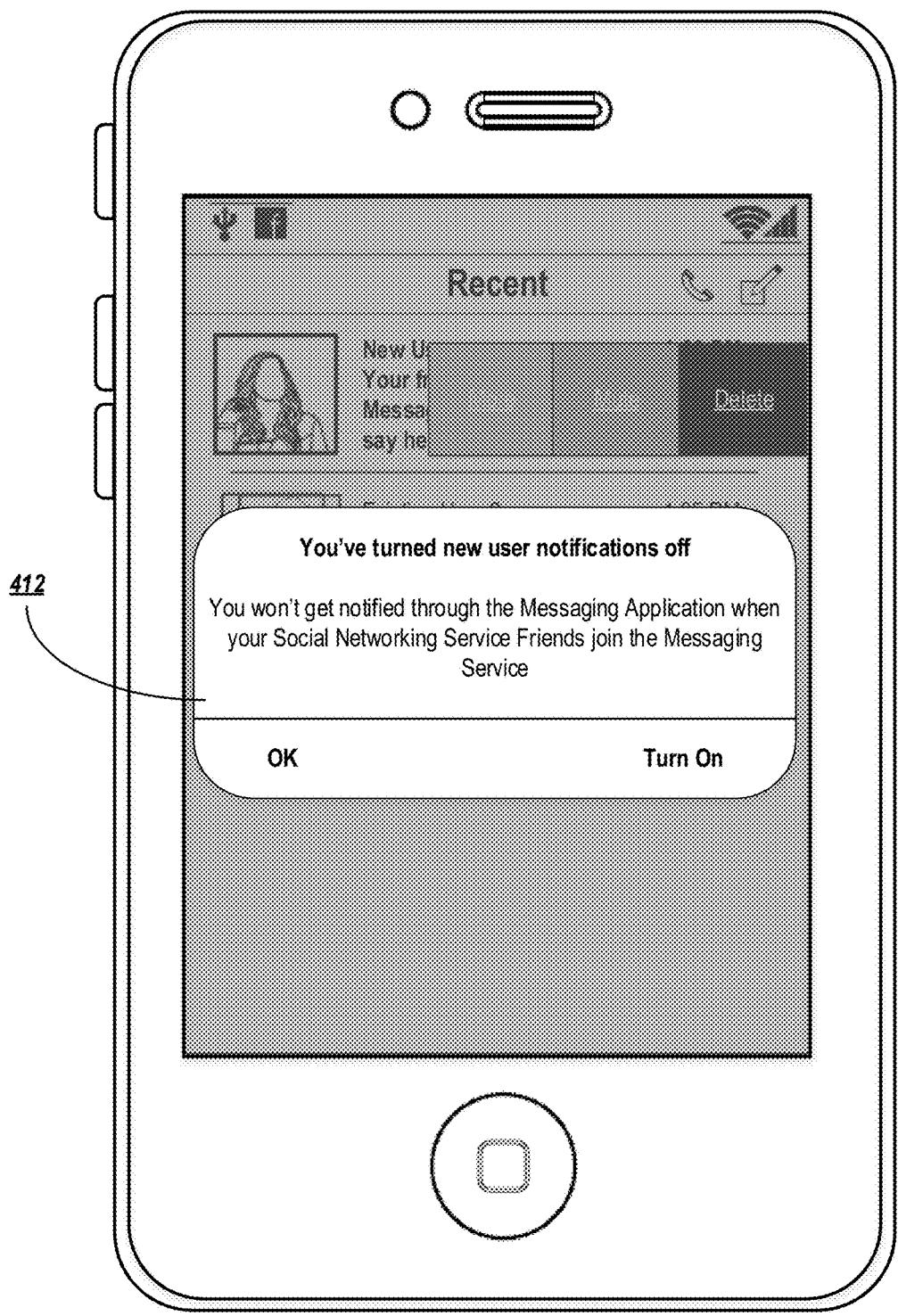

Upon selecting the supplementary icon 406, a supplementary menu 408 is displayed, as shown in FIG. 4C. The supplementary menu 408 includes an option 410 to instruct the messaging service to stop sending status change notifications. Upon selecting the option 410, the messaging server may exclude the current existing user from further consideration for receiving status update messages. A confirmation message 412 may be displayed, as shown in FIG. 4D.

These examples may be implemented by a messaging system that is provided either locally, at a client device, or remotely (e.g., at a remote server). FIGS. 5A-5D depict various examples of messaging systems, and are discussed in more detail below.

Messaging System Overview

FIG. 5A depicts an exemplary centralized messaging system 500, in which functionality for organizing messages asynchronously and/or using threads is integrated into a messaging server. The centralized system 500 may implement some or all of the structure and/or operations of a messaging service in a single computing entity, such as entirely within a single centralized server device 526.

The messaging system 500 may include a computer-implemented system having software applications that include one or more components. Although the messaging system 500 shown in FIG. 5A has a limited number of elements in a certain topology, the messaging system 500 may include more or fewer elements in alternate topologies.

A messaging service 500 may be generally arranged to receive, store, and deliver messages. The messaging service 500 may store messages while messaging clients 520, such as may execute on client devices 510, are offline and deliver the messages once the messaging clients are available.

A client device 510 may transmit messages addressed to a recipient user, user account, or other identifier resolving to a receiving client device 510. In exemplary embodiments, each of the client devices 510 and their respective messaging clients 520 are associated with a particular user or users of the messaging service 500. In some embodiments, the client devices 510 may be cellular devices such as smartphones and may be identified to the messaging service 500 based on a phone number associated with each of the client devices 510. In some embodiments, each messaging client may be associated with a user account registered with the messaging service 500. In general, each messaging client may be addressed through various techniques for the reception of messages. While in some embodiments the client devices 510 may be cellular devices, in other embodiments one or more of the client devices 510 may be personal computers, tablet devices, any other form of computing device.

The client 510 may include one or more input devices 512 and one or more output devices 518. The input devices 512 may include, for example, microphones, keyboards, cameras, electronic pens, touch screens, and other devices for receiving inputs including message data, requests, commands, user interface interactions, selections, and other types of input. The output devices 518 may include a speaker, a display device such as a monitor or touch screen, and other devices for presenting an interface to the messaging system 500.

The client 510 may include a memory 519, which may be a non-transitory computer readable storage medium, such as one or a combination of a hard drive, solid state drive, flash storage, read only memory, or random access memory. The memory 519 may a representation of an input 514 and/or a representation of an output 516, as well as one or more applications. For example, the memory 519 may store a messaging client 520 and/or a social networking client that allows a user to interact with a social networking service.

The input 514 may be textual, such as in the case where the input device 212 is a keyboard. Alternatively, the input 514 may be an audio recording, such as in the case where the input device 512 is a microphone. Accordingly, the input 514 may be subjected to automatic speech recognition (ASR) logic in order to transform the audio recording to text that is processable by the messaging system 500. The ASR logic may be located at the client device 510 (so that the audio recording is processed locally by the client 510 and corresponding text is transmitted to the messaging server 526), or may be located remotely at the messaging server 526 (in which case, the audio recording may be transmitted to the messaging server 526 and the messaging server 526 may process the audio into text). Other combinations are also possible—for example, if the input device 512 is a touch pad or electronic pen, the input 514 may be in the form of handwriting, which may be subjected to handwriting or optical character recognition analysis logic in order to transform the input 512 into processable text.

The client 510 may be provided with a network interface 522 for communicating with a network 524, such as the Internet. The network interface 522 may transmit the input 512 in a format and/or using a protocol compatible with the network 524 and may receive a corresponding output 516 from the network 524.

The network interface 522 may communicate through the network 524 to a messaging server 526. The messaging server 526 may be operative to receive, store, and forward messages between messaging clients.

The messaging server 526 may include a network interface 522, messaging preferences 528, and a notification component 530. The messaging preferences 528 may include one or more privacy settings for one or more users and/or message threads. For example, the messaging preferences 528 may include a setting that indicates whether to display messages synchronously or asynchronously. Furthermore, the messaging preferences 528 may include one or more settings, including default settings, for the logic described herein.

The notification component 530 may include an account identifier 532 that is operable to identify a number of existing users to receive status update notifications. The notification component 530 may further include an account notifier 534 that is operable to generate and send notification messages to the existing users identified by the account identifier 532. The notification component 530 is discussed in more detail in connection with FIG. 7.

The network interface 522 of the client 510 and/or the messaging server 526 may also be used to communicate through the network 524 with a social networking server 536. The social networking server 536 may include or may interact with a social networking graph 538 that defines connections in a social network. Furthermore, the messaging server 526 may connect to the social networking server 536 for various purposes, such as retrieving connection information, messaging history, event details, etc. from the social network.

A user of the client 510 may be an individual (human user), an entity (e.g., an enterprise, business, or third-party application), or a group (e.g., of individuals or entities) that interacts or communicates with or over the social networking server 536. The social-networking server 536 may be a network-addressable computing system hosting an online social network. The social networking server 536 may generate, store, receive, and send social-networking data, such as, for example, user-profile data, concept-profile data, social-graph information, or other suitable data related to the online social network. The social networking server 536 may be accessed by the other components of the network environment either directly or via the network 524.

The social networking server 536 may include an authorization server (or other suitable component(s)) that allows users to opt in to or opt out of having their actions logged by social-networking server 536 or shared with other systems (e.g., third-party systems, such as the messaging server 526), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 536 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

In particular embodiments, privacy settings may be associated with particular elements of the social networking graph 538. Privacy settings of a social-graph element, such as a node or an edge, may specify how the social-graph element, information associated with the social-graph element, or content objects associated with the social-graph element can be accessed using the online social network. As an example and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social networking server 536 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social networking server 536 may send a request to the data store for the object. The request may identify the user associated with the request. The requested data object may only be sent to the user (or a client system 510 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network for various purposes. Targeting criteria used to identify and target users may include explicit, stated user interests on social-networking server 536 or explicit connections of a user to a node, object, entity, brand, or page on social networking server 536. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

The centralized embodiment depicted in FIG. 5A may be well-suited to deployment as a new system or as an upgrade to an existing system, because the logic for pivoting to a group conversation (e.g., the logic of the account identifier 532 and/or the logic of the account notifier 534) are incorporated into the messaging server 526. In contrast, FIG. 5B depicts an exemplary distributed messaging system 550, in which functionality for recognizing productive intent and generating a list of suggested recipients is distributed and remotely accessible from the messaging server. Examples of a distributed system 550 include a client-server architecture, a 3-tier architecture, an N-tier architecture, a tightly-coupled or clustered architecture, a peer-to-peer architecture, a master-slave architecture, a shared database architecture, and other types of distributed systems.

Many of the components depicted in FIG. 5B are identical to those in FIG. 5A, and a description of these elements is not repeated here for the sake of brevity. The primary difference between the centralized embodiment and the distributed embodiment is the addition of a separate threading server 552, which hosts the thread creation component 532 and the thread display component 534. The threading server 552 may be distinct from the messaging server 526 but may communicate with the messaging server 526, either directly or through the network 524, to provide the functionality of the account identifier 532 and the account notifier 534 to the messaging server 526.

The embodiment depicted in FIG. 5B may be particularly well suited to allow exemplary embodiments to be deployed alongside existing messaging systems, for example when it is difficult or undesirable to replace an existing messaging server. Additionally, in some cases the messaging server 526 may have limited resources (e.g. processing or memory resources) that limit or preclude the addition of the additional pivot functionality. In such situations, the capabilities described herein may still be provided through the separate pivot server 552.

Figure 5C:
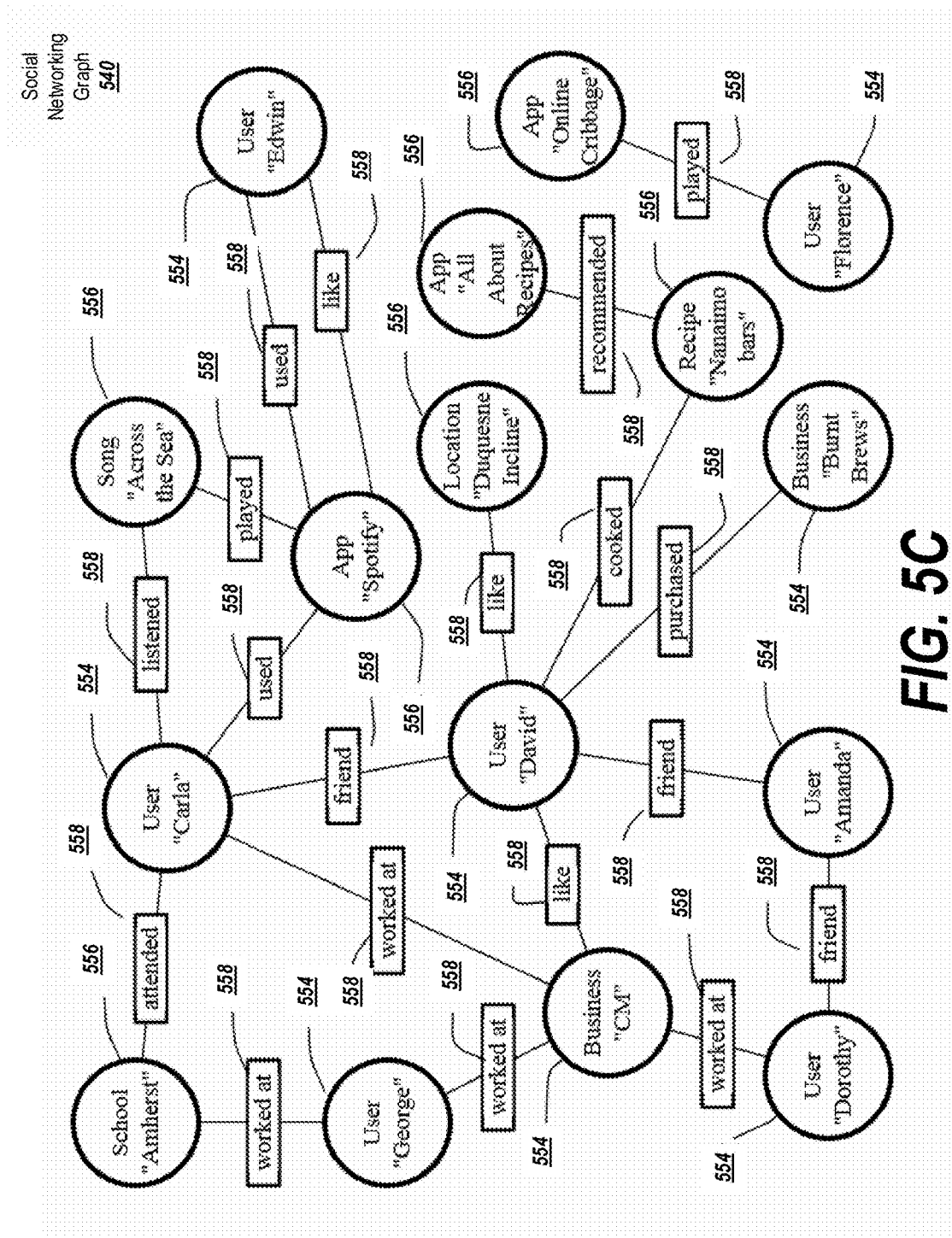
FIG. 5C depicts the social networking graph of FIGS. 5A-5B in more detail.

FIG. 5C illustrates an example of a social networking graph 538. In exemplary embodiments, a social networking service may store one or more social graphs 538 in one or more data stores as a social graph data structure via the social networking service.

The social graph 538 may include multiple nodes, such as user nodes 554 and concept nodes 556. The social graph 228 may furthermore include edges 558 connecting the nodes. The nodes and edges of social graph 228 may be stored as data objects, for example, in a data store (such as a social-graph database). Such a data store may include one or more searchable or queryable indexes of nodes or edges of social graph 228.

The social graph 538 may be accessed by a social-networking server 226, client system 210, third-party system (e.g., the translation server 224), or any other approved system or device for suitable applications.

A user node 554 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 554 corresponding to the user, and store the user node 30 in one or more data stores. Users and user nodes 554 described herein may, where appropriate, refer to registered users and user nodes 554 associated with registered users. In addition or as an alternative, users and user nodes 554 described herein may, where appropriate, refer to users that have not registered with the social-networking system. In particular embodiments, a user node 554 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 554 may be associated with one or more data objects corresponding to information associated with a user. In particular embodiments, a user node 554 may correspond to one or more webpages. A user node 554 may be associated with a unique user identifier for the user in the social-networking system.

In particular embodiments, a concept node 556 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 556 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 556 may be associated with one or more data objects corresponding to information associated with concept node 556. In particular embodiments, a concept node 556 may correspond to one or more webpages.

In particular embodiments, a node in social graph 538 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 556. Profile pages may be viewable by all or a selected subset of other users. As an example and not by way of limitation, a user node 554 may have a corresponding user-profile page in which the corresponding user may add content, make declarations, or otherwise express himself or herself. A business page such as business page 205 may comprise a user-profile page for a commerce entity. As another example and not by way of limitation, a concept node 556 may have a corresponding concept-profile page in which one or more users may add content, make declarations, or express themselves, particularly in relation to the concept corresponding to concept node 556.

In particular embodiments, a concept node 556 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 554 corresponding to the user and a concept node 556 corresponding to the third-party webpage or resource and store edge 558 in one or more data stores.

In particular embodiments, a pair of nodes in social graph 538 may be connected to each other by one or more edges 558. An edge 558 connecting a pair of nodes may represent a relationship between the pair of nodes. In particular embodiments, an edge 558 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 558 connecting the first user's user node 554 to the second user's user node 554 in social graph 538 and store edge 558 as social-graph information in one or more data stores. In the example of FIG. 5C, social graph 538 includes an edge 558 indicating a friend relation between user nodes 554 of user "Amanda" and user "Dorothy." Although this disclosure describes or illustrates particular edges 558 with particular attributes connecting particular user nodes 554, this disclosure contemplates any suitable edges 558 with any suitable attributes connecting user nodes 554. As an example and not by way of limitation, an edge 558 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 538 by one or more edges 558.

In particular embodiments, an edge 558 between a user node 554 and a concept node 556 may represent a particular action or activity performed by a user associated with user node 554 toward a concept associated with a concept node 556. As an example and not by way of limitation, as illustrated in FIG. 5C, a user may "like," "attended," "played," "listened," "cooked," "worked at," or "watched" a concept, each of which may correspond to a edge type or subtype. A concept-profile page corresponding to a concept node 556 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 558 and a "used" edge (as illustrated in FIG. 5C) between user nodes 554 corresponding to the user and concept nodes 556 corresponding to the song and application to indicate that the user listened to the song and used the application. Moreover, the social-networking system may create a "played" edge 558 (as illustrated in FIG. 5C) between concept nodes 556 corresponding to the song and the application to indicate that the particular song was played by the particular application. In this case, "played" edge 558 corresponds to an action performed by an external application (SPOTIFY) on an external audio file (the song "Across the Sea"). Although this disclosure describes particular edges 558 with particular attributes connecting user nodes 554 and concept nodes 556, this disclosure contemplates any suitable edges 558 with any suitable attributes connecting user nodes 554 and concept nodes 556. Moreover, although this disclosure describes edges between a user node 554 and a concept node 556 representing a single relationship, this disclosure contemplates edges between a user node 554 and a concept node 556 representing one or more relationships. As an example and not by way of limitation, an edge 558 may represent both that a user likes and has used at a particular concept. Alternatively, another edge 558 may represent each type of relationship (or multiples of a single relationship) between a user node 554 and a concept node 556 (as illustrated in FIG. 5C between user node 554 for user "Edwin" and concept node 556 for "SPOTIFY").

In particular embodiments, the social-networking system may create an edge 558 between a user node 554 and a concept node 556 in social graph 538. As an example and not by way of limitation, a user viewing a concept-profile page (such as, for example, by using a web browser or a special-purpose application hosted by the user's client system) may indicate that he or she likes the concept represented by the concept node 556 by clicking or selecting a "Like" icon, which may cause the user's client system to send to the social-networking system a message indicating the user's liking of the concept associated with the concept-profile page. In response to the message, the social-networking system may create an edge 558 between user node 554 associated with the user and concept node 556, as illustrated by "like" edge 558 between the user and concept node 556. In particular embodiments, the social-networking system may store an edge 558 in one or more data stores. In particular embodiments, an edge 558 may be automatically formed by the social-networking system in response to a particular user action. As an example and not by way of limitation, if a first user uploads a picture, watches a movie, or listens to a song, an edge 558 may be formed between user node 554 corresponding to the first user and concept nodes 556 corresponding to those concepts. Although this disclosure describes forming particular edges 558 in particular manners, this disclosure contemplates forming any suitable edges 558 in any suitable manner.

The social graph 538 may further comprise a plurality of product nodes. Product nodes may represent particular products that may be associated with a particular business. A business may provide a product catalog to a consumer-to-business service and the consumer-to-business service may therefore represent each of the products within the product in the social graph 538 with each product being in a distinct product node. A product node may comprise information relating to the product, such as pricing information, descriptive information, manufacturer information, availability information, and other relevant information. For example, each of the items on a menu for a restaurant may be represented within the social graph 538 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 538. The information for a product node may be manipulated by the social-networking system as a product object that encapsulates information regarding the referenced product.

As such, the social graph 538 may be used to infer shared interests, shared experiences, or other shared or common attributes of two or more users of a social-networking system. For instance, two or more users each having an edge to a common business, product, media item, institution, or other entity represented in the social graph 538 may indicate a shared relationship with that entity, which may be used to suggest customization of a use of a social-networking system, including a messaging system, for one or more users.

Next, logic for notifying existing users of status changes with regards to other users is described.

New User Notification Methodology

Figure 6:
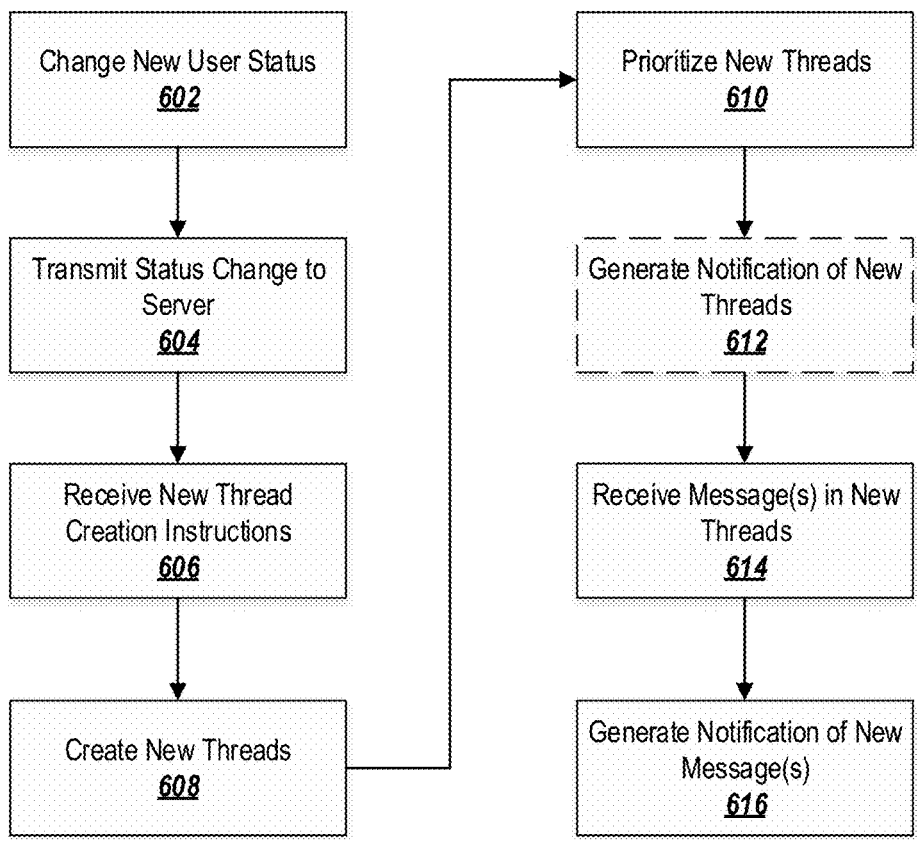
FIG. 6 is a flowchart depicting an exemplary process for new account or status change notifications as performed on a client device of the new user.
Figure 7:
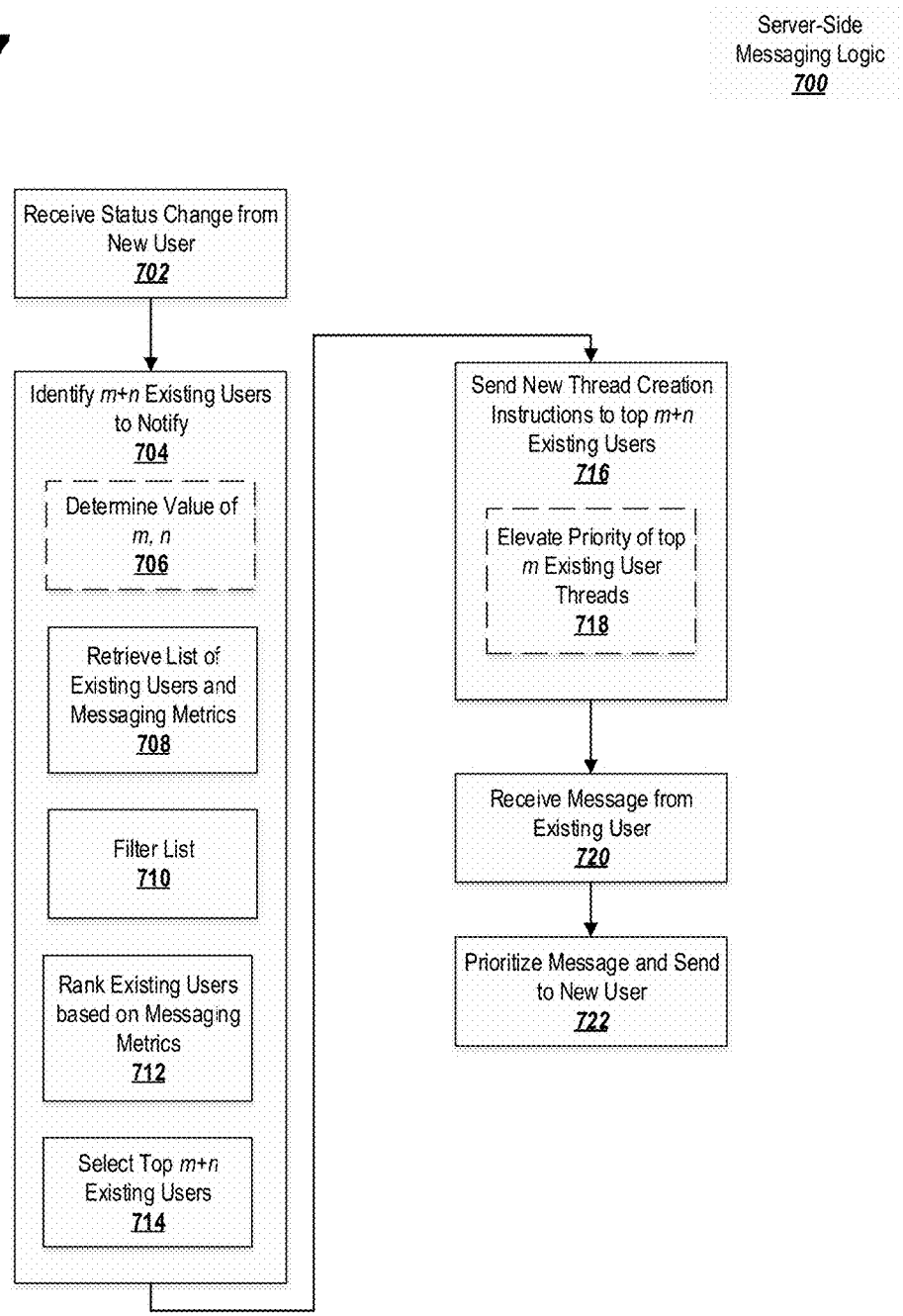
FIG. 7 is a flowchart depicting an exemplary process for new account or status change notifications as performed on a messaging server.
Figure 8:
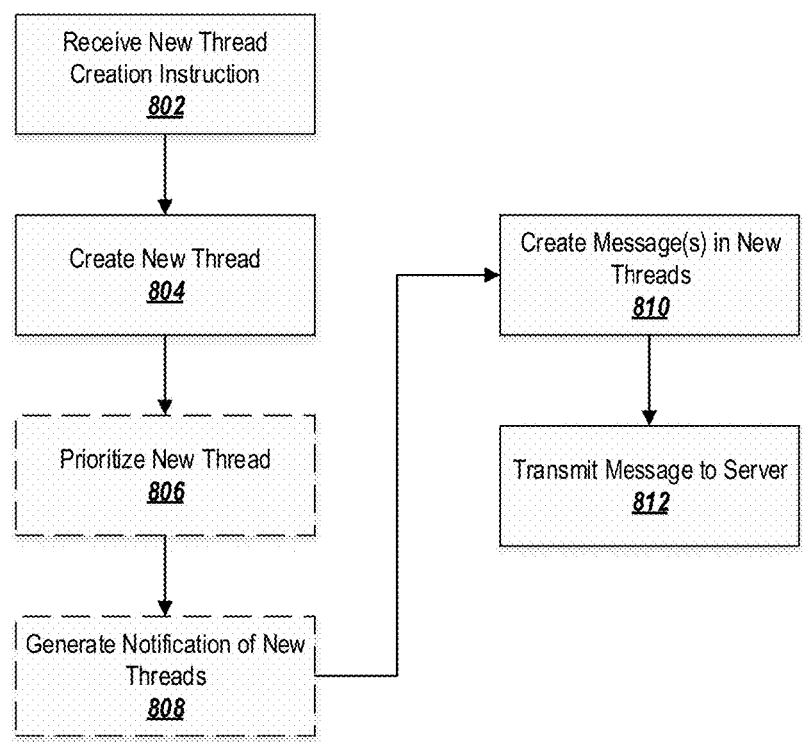
FIG. 8 is a flowchart depicting an exemplary process for new account or status change notifications as performed on a client device of an existing user.

FIGS. 6-8 are a set of flowcharts depicting exemplary logic for performing novel aspects of the disclosed architecture. While, for purposes of simplicity of explanation, the methodologies shown herein may be described as a series of acts, it is to be understood and appreciated that the methodologies are not limited by the order of acts, as some acts may occur in a different order and/or concurrently with other acts from that shown and described. For example, those skilled in the art will understand that a methodology could alternatively be represented as a series of interrelated states or events, such as in a state diagram. Moreover, not all acts illustrated may be required for an implementation.

FIG. 6 depicts exemplary messaging logic 600 for implementation on a user undergoing a status change. Although the example described will be given in terms of a "new user," it is recognized that the status change need not necessarily be the creation of a new account. For example, at step block, the logic receives a change in status of the new user. The change in status may be the installation of the messaging application for the first time or the creation of a new user account. Alternatively the change in status may be the installation or use of the messaging application for the first time in a predetermined period of time (e.g., 30 days). The change in status may be a change in a friendship or relationship status of the user, which may be changed via a social networking service associated with the messaging service. The change in status may also be a change in the location of the user, which may trigger the system to identify other nearby users and prompt the other nearby users to consider messaging the user. Other examples of status changes may include the creation of a social networking group including the user, attendance at an event, being tagged in a photo, or an indication that the user is visiting a new city.

At block 604, the user's client may transmit a status change notification to a messaging server. The notification may indicate to the messaging server what type of status has been changed and to what the status has been changed.

In some cases, the client may refrain from sending a status notification. For example, if a new user creates a new account, but sends a predetermined number of messages in a predetermined period of time, the notification may not be sent out. For example, if the new user sends five or more messages within an hour of installing the messaging application, then the user may already be considered to be highly active and may not need encouragement to send messages. In this case, creating prioritized threads may be considered to be intrusive or unwanted, and may only serve to get in the way of the already-active user.

At block 606, the user's client may receive one or more new thread creation instructions. The new threads may be message threads associated with one or more existing users identified by the messaging server, where the messaging service suggests that the existing users message the current user. The new thread creation instructions may include, for example, one or more thread IDs associated with the new threads, and may instruct the user's client to set up threads corresponding to the thread IDs.

At block 608, the client may create new treads corresponding to the instructions received at block 606. This may involve adding a placeholder message to the thread, which in some embodiments may encourage the new user to message the existing users identified by the messaging server. In this way, a new user's list of messages may be populated with specific calls to action (e.g., encouraging the new user to message the existing users identified by the server), rather than the new user being faced with a blank interface.

When creating the new threads at block 608, optionally the existing users associated with the threads may be distinguished in the user's contacts list, as shown in FIG. 3B.

At block 610, the client may prioritize the new threads. In the event that the user already has received one or more other messages in other threads (or later receives one or more other messages in threads not affiliated with the threads created at block 608), the new threads created at block 608 may be distinguished from, and prioritized over, the other threads. The prioritized threads may appear first in a list of threads on the user's messaging application, may be displayed with different typeface (e.g., bold).

At block 612, the client may optionally generate a notification of the newly created threads. For example, the client may generate one or more OS notifications, such as lock-screen notifications or general notifications (e.g., a push notification), and/or a badge associated with the messaging application icon or one or more icons within the messaging application may be updated to indicate the presence of new threads. In some embodiments, the client may display an animation (e.g., confetti raining down when the user becomes friends with another user or an existing user's friend joins the messaging service).

At block 614, the client may receive one or more new messages associated with the new threads may be received from the messaging service. The new messages may be associated with a thread ID, and the client may add the message to the thread associated with the thread ID. The new messages may be elevated or prioritized over messages received from sources not associated with the threads created at block 608.

At block 616, the client may generate one or more notifications of the new messages, similarly to the notifications generated in block 612.

FIG. 7 depicts exemplary logic 700 employed by a messaging server to select existing users to receive notifications of status updates and to coordinate the sending of status notifications and the resulting messages.

At block 702, the server may receive a notification of a status change from a new user, corresponding to the status change sent at block 604.

In response to receiving the notification, at block 704 the server may identify a number of existing users to receive a notification of the status change. In some embodiments, the number of users may be a predetermined number (e.g., 5, 10, 20, 100, etc.). In some embodiments, the number of users may be dynamically selected based on one or more metrics. For example, one such metric is the number of threads or messages that will fit on the display of the new user's (i.e., the user who underwent the status change) messaging application. For instance, if the new user is using a mobile device on which 5 messages will fit on a single screen (such as the recent messages interface 210 of FIG. 2C), then 5 existing users may be selected to receive notifications.

In some embodiments, two sets of users may be selected. Optionally, at block 706, a first set of m higher-priority existing users may be selected to receive notifications and to have their message threads elevated in priority (on one or both of the new user's client and the existing user's client). Selecting a number m of higher-priority users to have elevated or prioritized threads may prevent the new user from becoming overwhelmed with new messages or thread creations. A second set of n lower-priority existing users may be selected to receive the notifications, but without having their threads elevated in priority. In some embodiments, the higher-priority group of existing users may have new threads automatically created for them (causing the new user's client to display an existing thread in the recent messages interface), whereas the lower-priority group may not have new threads created automatically. If members of the lower-priority group choose to message the new user, a new thread may be created at that time.

By selecting an appropriate number m, e.g. based on available display space, and another lower-priority group of n existing users (e.g., based on a predetermined number n), the probability that the new user will be invited to join a number of conversations (and therefore become active on the messaging service) may be increased without overwhelming the new user with new threads.

At block 708, a list of existing users associated with the user who has undergone a status change may be retrieved from the messaging application and/or a social networking service associated with the social networking application. For example, the user's contacts list or friends list may be retrieved. In addition to the list of existing users, a messaging metric relating each existing user to the user that underwent the status change. The messaging metric may indicate a likelihood that a conversation between the existing user and the user undergoing the status change would result in a meaningful conversation. For example, U.S. patent application Ser. No. 14/964,232, filed on Dec. 9, 2015 and entitled "Predicting and Facilitating Increased Use of a Messaging Application," describes the calculation of a score that identifies which users of a messaging system are likely to be highly active, and which are not. This score may be used to identify if a message from the existing user would be likely to result in an active conversation.

The messaging coefficient may be calculated based on interactions between the new user and other users in a social networking service associated with the messaging service (e.g., social networking engagements such as 'likes,' commenting on another user's posts, etc.). The messaging coefficient may also be determined based at least in part on interaction information as determined by the new user's interaction for a predetermined time (e.g., 24 hours) after initially joining the messaging service. Still further, the messaging coefficient may be determined, at least in part, based on the user's interactions through another messaging service (e.g., through SMS on a user's mobile device).

Alternatively or in addition, the messaging coefficient may be calculated based on user connectedness (even if no interaction information is available in the messaging service or the social networking service). Techniques for calculating the messaging coefficient in the absence of interaction data are described, for example, in U.S. patent application Ser. No. 15/167,958, filed on May 27, 2016 and entitled "Forward Coefficients," and in U.S. patent application Ser. No. 15/167,959, filed on May 27, 2016 and entitled "Bilateral Coefficients."

At block 710, the retrieved list of existing users may be filtered to remove users that have already received a predetermined number of notifications in a predetermined period of time. This filtering may prevent existing users from being overwhelmed with status change notifications, which might cause the existing user to be less inclined to follow-up on the notifications. For example, block 710 may set a rate limit of one notification per day, and/or two per week.

At block 712, the filtered list may be ordered or ranked based on the messaging metrics retrieved at block 708. At block 714, the top m existing users from the ranked list may be selected as a higher-priority group of users for the creation of prioritized threads, and the remaining top m existing users may be selected as a lower-priority group of users. Alternatively, if a lower-priority group is not to be used, then only the top m users may be selected.

In some embodiments, the procedures performed in block 704 may be performed immediately upon receiving a notification of a status change. Alternatively, the procedures of block 704 may be delayed until a predetermined time so that multiple status changes may be processed in a batch. Batch processing allows the list created at block 714 to be optimized by the messaging metrics over a group of status changes. This may be used, for example, to prevent existing users that are relatively highly ranked with respect to a first new user from being assigned to relatively lower ranked second new user, therefore being filtered out from consideration for the first user at block 710.

At block 716, the server may send new thread creation instructions to the m+n existing users identified at block 704. This may involve automatically creating a new thread (at least for the top m existing users) and assigning a thread ID to the new thread. Optionally, at block 718, the priority of the top m existing user threads may be elevated (e.g., by prioritizing messages of the threads over other messages, by sending notifications that would not otherwise be sent, by creating badges or otherwise distinguishing application icons, etc.). This may involve, for example, setting a high-priority flag in header data of the thread creation message. In some embodiments, the presence of administrative text in a message may automatically elevate the message's thread at a client; accordingly, an automatic message may be generated for the thread, and administrative text may be added to the message. The receipt of such a message at a client may cause the message to be recognized as administrative and automatically elevated in priority.

At block 720, the server may receive a message from an existing user associated with the threads created as a result of block 716. The message may include an indication of a thread ID, allowing the server to identify the thread as being associated with the status change. At block 722, the message may be prioritized in a manner similar to block 718, and the message may be sent to the new user that underwent the status change.

FIG. 8 depicts exemplary logic 800 as performed by a client of the existing user that receives the status update notifications from the server.

At block 802, the client may receive a new thread creation instruction from the server. The new thread creation instruction may be accompanied by a thread ID. At block 804, the messaging application on the client may create a new thread having the thread ID, and may optionally create a new message in the thread. If the server sent a message, such as a message including administrative text, as part of the thread creation process, the client may add the message to the thread.

At block 806, the client may optionally prioritize the new thread in a manner similar to block 610 of FIG. 6. This may involve adding a section to the contacts list indicating users who have undergone recent status changes. Further optionally, at block 808 the client may generate a notification regarding the creation of the new thread, in a manner similar to block 612 of FIG. 6.

At block 810, the client may receive a message associated with the new thread. At block 812, the client may transmit the created message to the messaging server.

The embodiments described above may be performed by a messaging architecture, an example of which is next described with reference to FIG. 9.

Messaging Architecture

Figure 9:
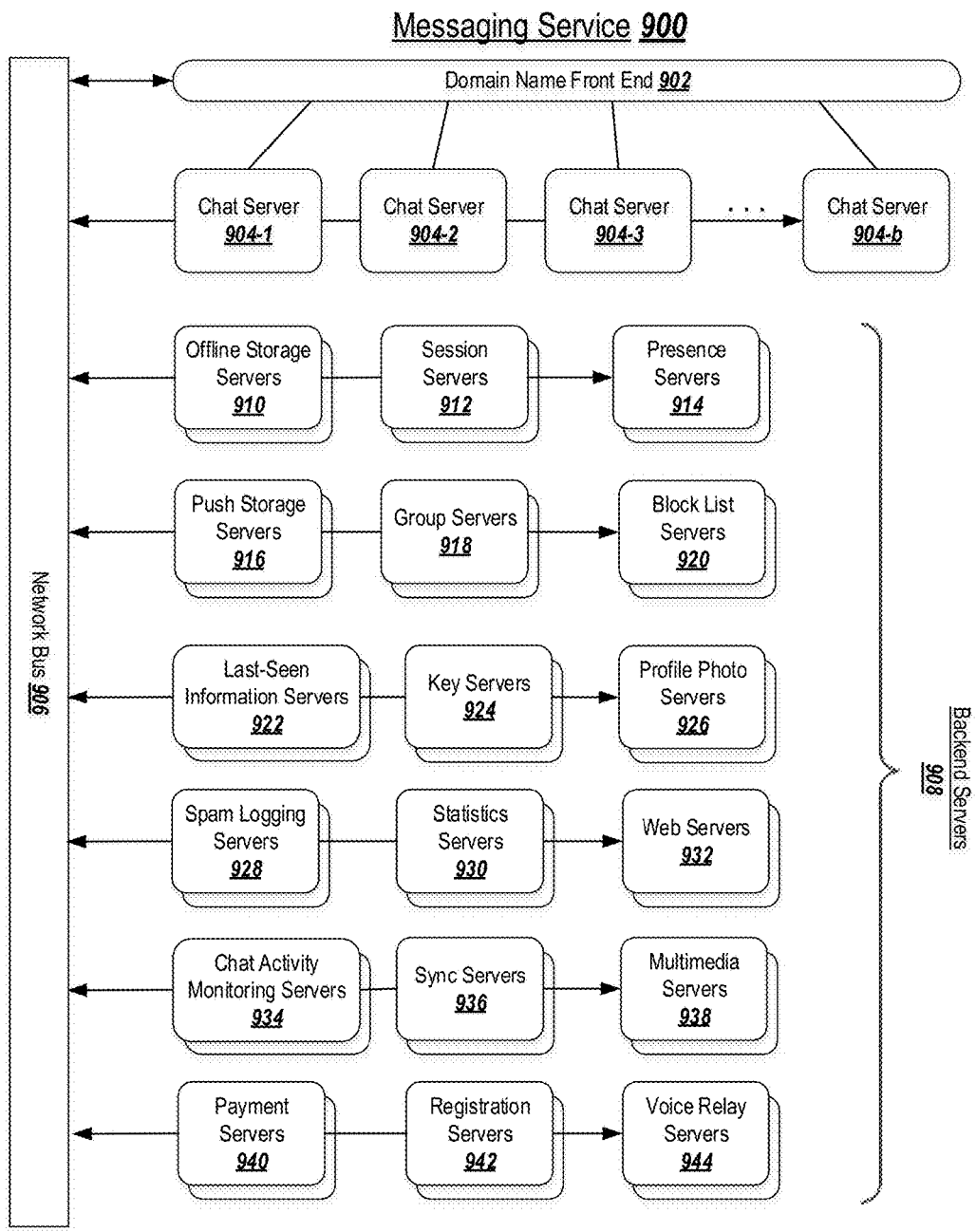
FIG. 9 is a block diagram depicting an example of a system for a messaging service.

FIG. 9 illustrates an embodiment of a plurality of servers implementing various functions of a messaging service 900. It will be appreciated that different distributions of work and functions may be used in various embodiments of a messaging service 900.

The messaging service 900 may comprise a domain name front end 902. The domain name front end 902 may be assigned one or more domain names associated with the messaging service 900 in a domain name system (DNS). The domain name front end 902 may receive incoming connections and distribute the connections to servers providing various messaging services.

The messaging service 902 may comprise one or more chat servers 904. The chat servers 904 may comprise front-end servers for receiving and transmitting user-to-user messaging updates such as chat messages. Incoming connections may be assigned to the chat servers 904 by the domain name front end 902 based on workload balancing.

The messaging service 900 may comprise backend servers 908. The backend servers 908 may perform specialized tasks in the support of the chat operations of the front-end chat servers 904. A plurality of different types of backend servers 908 may be used. It will be appreciated that the assignment of types of tasks to different backend serves 908 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 900 may comprise one or more offline storage servers 910. The one or more offline storage servers 910 may store messaging content for currently-offline messaging clients in hold for when the messaging clients reconnect.

The messaging service 900 may comprise one or more sessions servers 912. The one or more session servers 912 may maintain session state of connected messaging clients.

The messaging service 900 may comprise one or more presence servers 914. The one or more presence servers 914 may maintain presence information for the messaging service 900. Presence information may correspond to user-specific information indicating whether or not a given user has an online messaging client and is available for chatting, has an online messaging client but is currently away from it, does not have an online messaging client, and any other presence state.

The messaging service 900 may comprise one or more push storage servers 916. The one or more push storage servers 916 may cache push requests and transmit the push requests to messaging clients. Push requests may be used to wake messaging clients, to notify messaging clients that a messaging update is available, and to otherwise perform server-side-driven interactions with messaging clients.

The messaging service 900 may comprise one or more group servers 918. The one or more group servers 918 may maintain lists of groups, add users to groups, remove users from groups, and perform the reception, caching, and forwarding of group chat messages.

The messaging service 900 may comprise one or more block list servers 920. The one or more block list servers 920 may maintain user-specific block lists, the user-specific incoming-block lists indicating for each user the one or more other users that are forbidden from transmitting messages to that user. Alternatively or additionally, the one or more block list servers 920 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 900 may comprise one or more last seen information servers 922. The one or more last seen information servers 922 may receive, store, and maintain information indicating the last seen location, status, messaging client, and other elements of a user's last seen connection to the messaging service 900.

The messaging service 900 may comprise one or more key servers 924. The one or more key servers may host public keys for public/private key encrypted communication.

The messaging service 900 may comprise one or more profile photo servers 926. The one or more profile photo servers 926 may store and make available for retrieval profile photos for the plurality of users of the messaging service 900.

The messaging service 900 may comprise one or more spam logging servers 928. The one or more spam logging servers 928 may log known and suspected spam (e.g., unwanted messages, particularly those of a promotional nature). The one or more spam logging servers 928 may be operative to analyze messages to determine whether they are spam and to perform punitive measures, in some embodiments, against suspected spammers (users that send spam messages).

The messaging service 900 may comprise one or more statistics servers 930. The one or more statistics servers may compile and store statistics information related to the operation of the messaging service 900 and the behavior of the users of the messaging service 900.

The messaging service 900 may comprise one or more web servers 932. The one or more web servers 932 may engage in hypertext transport protocol (HTTP) and hypertext transport protocol secure (HTTPS) connections with web browsers.

The messaging service 900 may comprise one or more chat activity monitoring servers 934. The one or more chat activity monitoring servers 934 may monitor the chats of users to determine unauthorized or discouraged behavior by the users of the messaging service 900. The one or more chat activity monitoring servers 934 may work in cooperation with the spam logging servers 928 and block list servers 920, with the one or more chat activity monitoring servers 934 identifying spam or other discouraged behavior and providing spam information to the spam logging servers 928 and blocking information, where appropriate to the block list servers 920.

The messaging service 900 may comprise one or more sync servers 936. The one or more sync servers 936 may sync the messaging system 500 with contact information from a messaging client, such as an address book on a mobile phone, to determine contacts for a user in the messaging service 900.

The messaging service 900 may comprise one or more multimedia servers 938. The one or more multimedia servers may store multimedia (e.g., images, video, audio) in transit between messaging clients, multimedia cached for offline endpoints, and may perform transcoding of multimedia.

The messaging service 900 may comprise one or more payment servers 940. The one or more payment servers 940 may process payments from users. The one or more payment servers 940 may connect to external third-party servers for the performance of payments.

The messaging service 900 may comprise one or more registration servers 942. The one or more registration servers 942 may register new users of the messaging service 900.

The messaging service 900 may comprise one or more voice relay servers 944. The one or more voice relay servers 944 may relay voice-over-Internet-protocol (VoIP) voice communication between messaging clients for the performance of VoIP calls.

Figure 10:
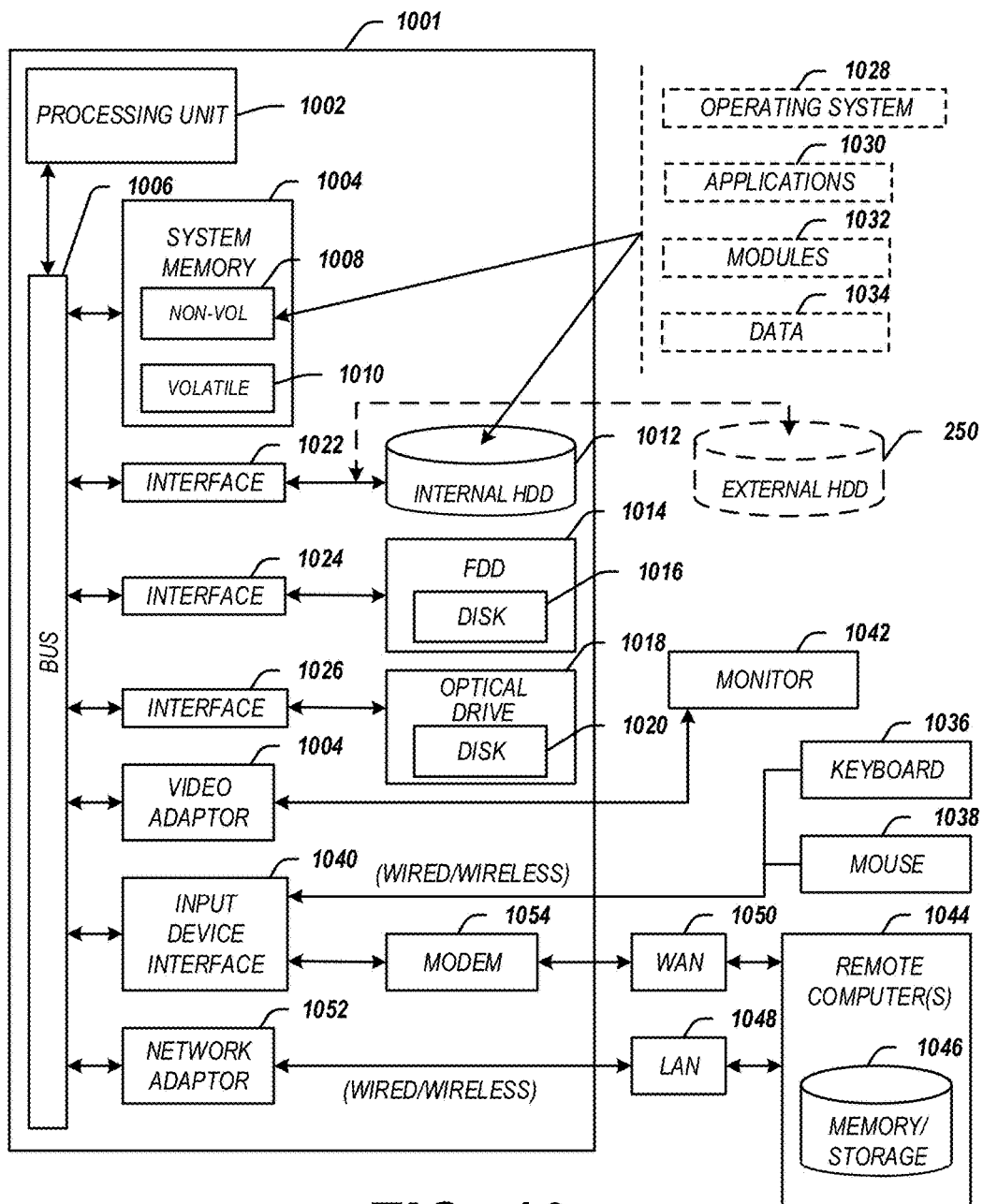
FIG. 10 is a block diagram illustrating an exemplary computing device suitable for use with exemplary embodiments.

The above-described methods may be embodied as instructions on a computer readable medium or as part of a computing architecture. FIG. 10 illustrates an embodiment of an exemplary computing architecture 1000 suitable for implementing various embodiments as previously described. In one embodiment, the computing architecture 1000 may comprise or be implemented as part of an electronic device, such as a computer 1001. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1002, a system memory 1004 and a system bus 1006. The processing unit 1002 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1002.

The system bus 1006 provides an interface for system components including, but not limited to, the system memory 1004 to the processing unit 1002. The system bus 1006 can be any of several types of bus structure that may further interconnect to a memory bus (with or without a memory controller), a peripheral bus, and a local bus using any of a variety of commercially available bus architectures. Interface adapters may connect to the system bus 1006 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1004 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1004 can include non-volatile memory 1008 and/or volatile memory 1010. A basic input/output system (BIOS) can be stored in the non-volatile memory 1008.

The computing architecture 1000 may include various types of computer-readable storage media in the form of one or more lower speed memory units, including an internal (or external) hard disk drive (HDD) 1012, a magnetic floppy disk drive (FDD) 1014 to read from or write to a removable magnetic disk 1016, and an optical disk drive 1018 to read from or write to a removable optical disk 1020 (e.g., a CD-ROM or DVD). The HDD 1012, FDD 1014 and optical disk drive 1020 can be connected to the system bus 1006 by an HDD interface 1022, an FDD interface 1024 and an optical drive interface 1026, respectively. The HDD interface 1022 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 1008, 1012, including an operating system 1028, one or more application programs 1030, other program modules 1032, and program data 1034. In one embodiment, the one or more application programs 1030, other program modules 1032, and program data 1034 can include, for example, the various applications and/or components of the messaging system 500.

A user can enter commands and information into the computer 1001 through one or more wire/wireless input devices, for example, a keyboard 1036 and a pointing device, such as a mouse 1038. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1002 through an input device interface 1040 that is coupled to the system bus 1006, but can be connected by other interfaces such as a parallel port, IEEE 694 serial port, a game port, a USB port, an IR interface, and so forth.

A monitor 1042 or other type of display device is also connected to the system bus 1006 via an interface, such as a video adaptor 1044. The monitor 1042 may be internal or external to the computer 1001. In addition to the monitor 1042, a computer typically includes other peripheral output devices, such as speakers, printers, and so forth.

The computer 1001 may operate in a networked environment using logical connections via wire and/or wireless communications to one or more remote computers, such as a remote computer 1044. The remote computer 1044 can be a workstation, a server computer, a router, a personal computer, portable computer, microprocessor-based entertainment appliance, a peer device or other common network node, and typically includes many or all of the elements described relative to the computer 1001, although, for purposes of brevity, only a memory/storage device 1046 is illustrated. The logical connections depicted include wire/wireless connectivity to a local area network (LAN) 1048 and/or larger networks, for example, a wide area network (WAN) 1050. Such LAN and WAN networking environments are commonplace in offices and companies, and facilitate enterprise-wide computer networks, such as intranets, all of which may connect to a global communications network, for example, the Internet.

When used in a LAN networking environment, the computer 1001 is connected to the LAN 1048 through a wire and/or wireless communication network interface or adaptor 1052. The adaptor 1052 can facilitate wire and/or wireless communications to the LAN 1048, which may also include a wireless access point disposed thereon for communicating with the wireless functionality of the adaptor 1052.

When used in a WAN networking environment, the computer 1001 can include a modem 1054, or is connected to a communications server on the WAN 1050, or has other means for establishing communications over the WAN 1050, such as by way of the Internet. The modem 1054, which can be internal or external and a wire and/or wireless device, connects to the system bus 1006 via the input device interface 1040. In a networked environment, program modules depicted relative to the computer 1001, or portions thereof, can be stored in the remote memory/storage device 1046. It will be appreciated that the network connections shown are exemplary and other means of establishing a communications link between the computers can be used.

The computer 1001 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
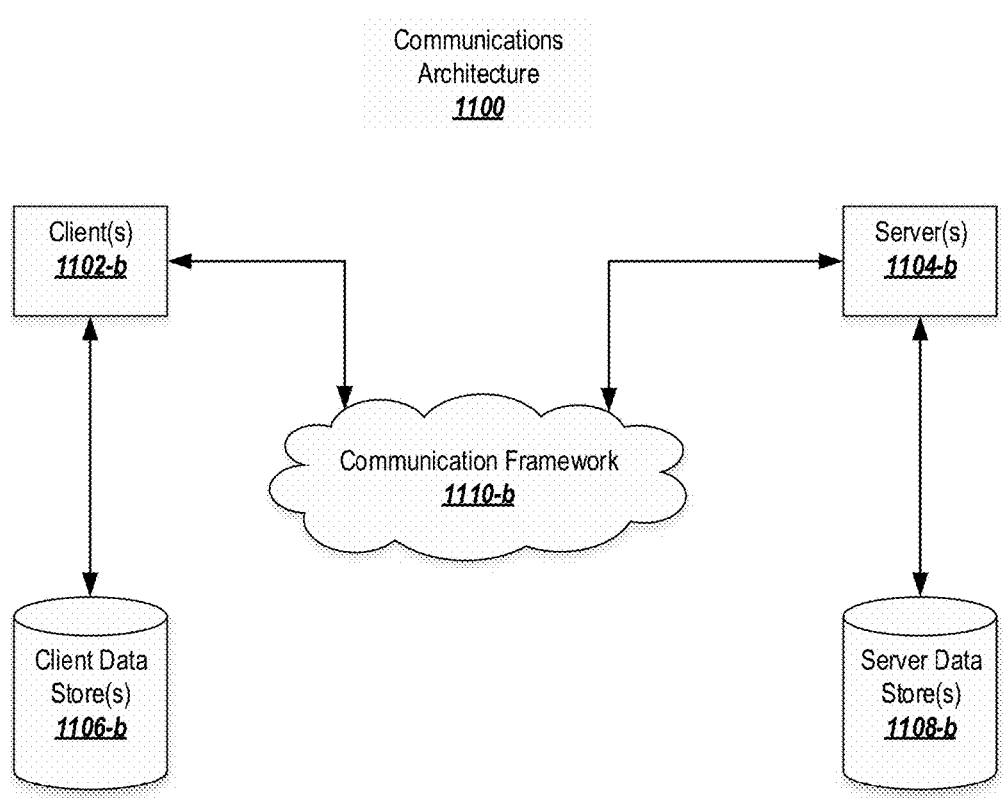
FIG. 11 depicts an exemplary communication architecture.

FIG. 11 is a block diagram depicting an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 includes one or more clients 1102 and servers 1104. The clients 1102 may implement the client device 510. The servers 1104 may implement the server device 526. The clients 1102 and the servers 1104 are operatively connected to one or more respective client data stores 1106 and server data stores 1108 that can be employed to store information local to the respective clients 1102 and servers 1104, such as cookies and/or associated contextual information.

The clients 1102 and the servers 1104 may communicate information between each other using a communication framework 1110. The communications framework 1110 may implement any well-known communications techniques and protocols. The communications framework 1110 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1110 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 12:
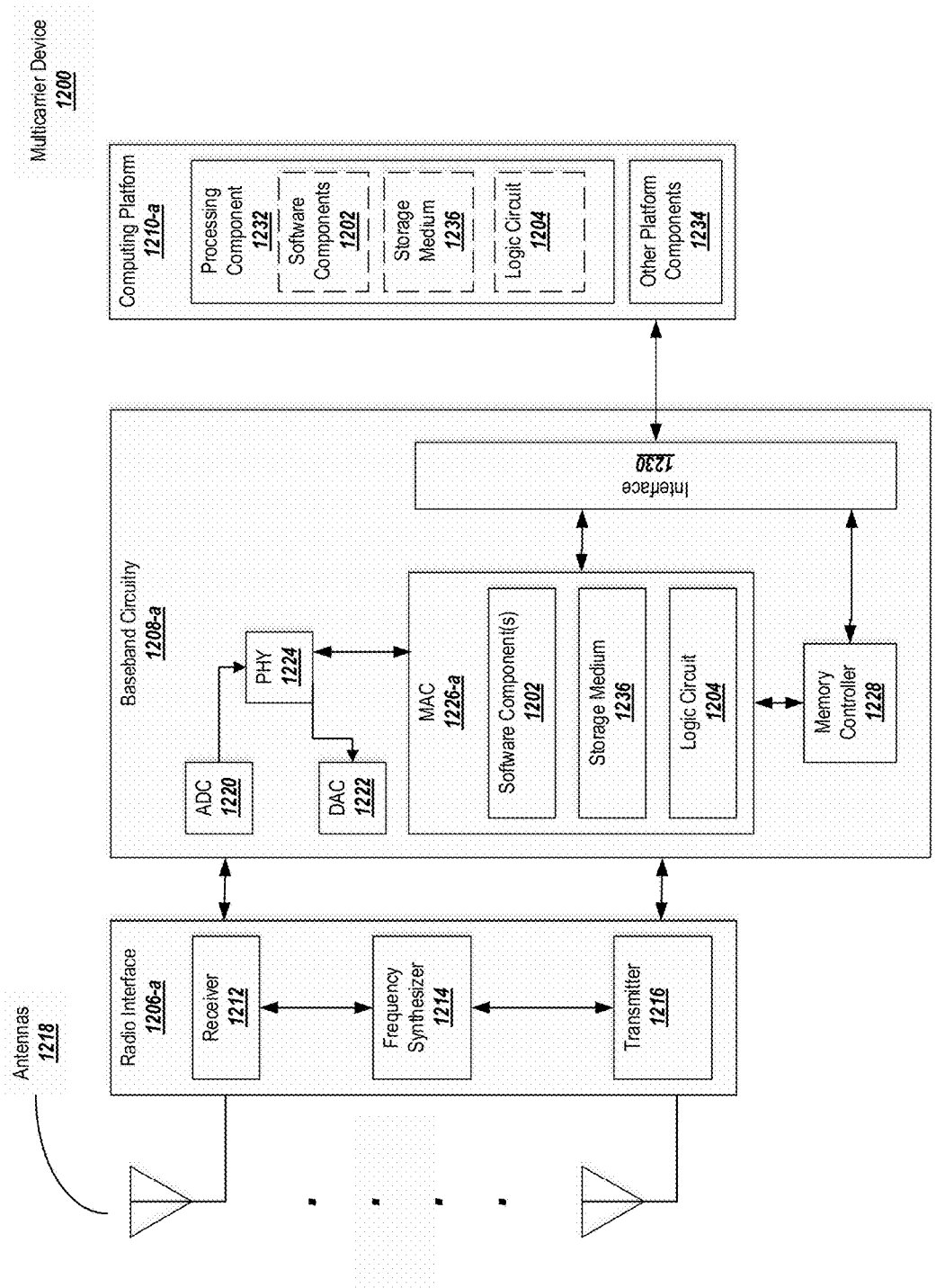
FIG. 12 is a block diagram depicting an exemplary multicarrier communications device.

FIG. 12 illustrates an embodiment of a device 1200 for use in a multicarrier OFDM system, such as the messaging system 500. The device 1200 may implement, for example, software components 1202 as described with reference to the messaging component logic 600, the intent determination logic 700, and the group selection logic 800. The device 1200 may also implement a logic circuit 1204. The logic circuit 1204 may include physical circuits to perform operations described for the messaging system 500. As shown in FIG. 12, device 1200 may include a radio interface 1206, baseband circuitry 1208, and a computing platform 1210, although embodiments are not limited to this configuration.

The device 1200 may implement some or all of the structure and/or operations for the messaging system 500 and/or logic circuit 1204 in a single computing entity, such as entirely within a single device. Alternatively, the device 1200 may distribute portions of the structure and/or operations for the messaging system 500 and/or logic circuit 1204 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 1206 may include a component or combination of components adapted for transmitting and/or receiving single carrier or multicarrier modulated signals (e.g., including complementary code keying (CCK) and/or orthogonal frequency division multiplexing (OFDM) symbols) although the embodiments are not limited to any specific over-the-air interface or modulation scheme. The radio interface 1206 may include, for example, a receiver 1212, a transmitter 1214 and/or a frequency synthesizer 1216. The radio interface 1206 may include bias controls, a crystal oscillator and/or one or more antennas 1218. In another embodiment, the radio interface 1206 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 1208 may communicate with the radio interface 1206 to process receive and/or transmit signals and may include, for example, an analog-to-digital converter 1220 for down converting received signals, and a digital-to-analog converter 1222 for up-converting signals for transmission. Further, the baseband circuitry 1208 may include a baseband or physical layer (PHY) processing circuit 1224 for PHY link layer processing of respective receive/transmit signals. The baseband circuitry 1208 may include, for example, a processing circuit 1226 for medium access control (MAC)/data link layer processing. The baseband circuitry 1208 may include a memory controller 1228 for communicating with the processing circuit 1226 and/or a computing platform 1210, for example, via one or more interfaces 1230.

In some embodiments, the PHY processing circuit 1224 may include a frame construction and/or detection module, in combination with additional circuitry such as a buffer memory, to construct and/or deconstruct communication frames, such as radio frames. Alternatively or in addition, the MAC processing circuit 1226 may share processing for certain of these functions or perform these processes independent of the PHY processing circuit 1224. In some embodiments, MAC and PHY processing may be integrated into a single circuit.

The computing platform 1210 may provide computing functionality for the device 1200. As shown, the computing platform 1210 may include a processing component 1232. In addition to, or alternatively of, the baseband circuitry 1208, the device 1200 may execute processing operations or logic for the messaging system 500 and logic circuit 1204 using the processing component 1232. The processing component 1232 (and/or the PHY 1224 and/or MAC 1226) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1210 may further include other platform components 1234. Other platform components 1234 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 1200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 1200 described herein, may be included or omitted in various embodiments of the device 1200, as suitably desired. In some embodiments, the device 1200 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 1200 may be implemented using single input single output (SISO) architectures. However, certain implementations may include multiple antennas (e.g., antennas 1218) for transmission and/or reception using adaptive antenna techniques for beamforming or spatial division multiple access (SDMA) and/or using MIMO communication techniques.

The components and features of the device 1200 may be implemented using any combination of discrete circuitry, application specific integrated circuits (ASICs), logic gates and/or single chip architectures. Further, the features of the device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium 1236 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method, comprising:
   receiving an indication from a messaging client that a first account associated with a messaging service has recently been activated;
   identifying existing accounts associated with the messaging service;
   selecting, based at least in part on a messaging coefficient that indicates a likelihood that a message will result in a meaningful conversation, a number of prioritized accounts from the existing accounts;
   creating, for each of the selected prioritized accounts, a blank messaging thread for communications between the respective prioritized account and the first account;
   elevating a priority of the created messaging threads, the elevated priority causing the messaging threads for the selected prioritized accounts to appear before non-prioritized account threads in the messaging client; and
   sending a notification to the prioritized accounts that the first account has recently been activated.

2. The method of claim 1, wherein the indication indicates that the account has recently been created or has recently returned from a period of inactivity greater than a predetermined threshold amount of time.

3. The method of claim 1, wherein the number of prioritized accounts is selected based at least in part on an amount of display space available to new user on the messaging client to accommodate messages from the prioritized accounts.

4. The method of claim 1, wherein the prioritized account is selected when a metric indicating that the prioritized account has not yet received a predetermined number of message requests over a predetermined time period.

5. The method of claim 1, wherein the messaging coefficient is determined based on an association between the first user and the existing user in a social networking service associated with the messaging service.

6. The method of claim 1, wherein sending the notification to the prioritized accounts comprises prioritizing the notification over other messages for the prioritized accounts.

7. A non-transitory computer-readable medium storing instructions configured to cause one or more processors to:
   receive an indication from a messaging client that a first account associated with a messaging service has recently been activated;
   identify existing accounts associated with the messaging service;
   select, based at least in part on a messaging coefficient that indicates a likelihood that a message will result in a meaningful conversation, a number of prioritized accounts from the existing accounts;
   create, for each of the selected prioritized accounts, a blank messaging thread for communications between the respective prioritized account and the first account;
   elevate a priority of the created messaging threads, the elevated priority causing the messaging threads for the selected prioritized accounts to appear before non-prioritized account threads in the messaging client; and
   send a notification to the prioritized accounts that the first account has recently been activated.

8. The medium of claim 7, wherein the indication indicates that the account has recently been created or has recently returned from a period of inactivity greater than a predetermined threshold amount of time.

9. The medium of claim 7, wherein the number of prioritized accounts is selected based at least in part on an amount of display space available to new user on the messaging client to accommodate messages from the prioritized accounts.

10. The medium of claim 7, wherein the prioritized account is selected when a metric indicating that the prioritized account has not yet received a predetermined number of message requests over a predetermined time period.

11. The medium of claim 7, wherein the messaging coefficient is determined based on an association between the first user and the existing user in a social networking service associated with the messaging service.

12. The medium of claim 7, wherein sending the notification to the prioritized accounts comprises prioritizing the notification over other messages for the prioritized accounts.

13. An apparatus comprising:
   a network receiver configured to receive an indication from a messaging client that a first account associated with a messaging service has recently been activated;
   a processor component configured to identify existing accounts associated with the messaging service, to select, based at least in part on a messaging coefficient that indicates a likelihood that a message will result in a meaningful conversation, a number of prioritized accounts from the existing accounts, to create, for each of the selected prioritized accounts, a blank messaging thread for communications between the respective prioritized account and the first account, and to elevate a priority of the created messaging threads, the elevated priority causing the messaging threads for the selected prioritized accounts to appear before non-prioritized account threads in the messaging client; and a network transmitter configured to send a notification to the prioritized accounts that the first account has recently been activated.

14. The apparatus of claim 13, wherein the number of prioritized accounts is selected based at least in part on an amount of display space available to new user on the messaging client to accommodate messages from the prioritized accounts.

15. The apparatus of claim 13, wherein the prioritized account is selected when a metric indicating that the existing account has not yet received a predetermined number of message requests over a predetermined time period.

16. The apparatus of claim 13, wherein the messaging coefficient is determined based on an association between the first user and the existing user in a social networking service associated with the messaging service.

17. The apparatus of claim 13, wherein sending the notification to the prioritized accounts comprises prioritizing the notification over other messages for the prioritized accounts.

* * * * *